(12) United States Patent
Binkley et al.

(10) Patent No.: US 11,222,132 B2
(45) Date of Patent: Jan. 11, 2022

(54) METHODS, APPARATUSES, AND SYSTEMS FOR DATA RIGHTS TRACKING

(71) Applicant: Optum, Inc., Minnetonka, MN (US)

(72) Inventors: Daniel L. Binkley, Burlington, CT (US); Lisa A. Hodne, Buffalo, MN (US)

(73) Assignee: OPTUM, INC., Minnetonka, MN (US)

( * ) Notice: Subject to any disclaimer, the term of this patent is extended or adjusted under 35 U.S.C. 154(b) by 47 days.

(21) Appl. No.: 16/592,134

(22) Filed: Oct. 3, 2019

(65) Prior Publication Data
US 2020/0110894 A1    Apr. 9, 2020

Related U.S. Application Data

(60) Provisional application No. 62/742,214, filed on Oct. 5, 2018.

(51) Int. Cl.
*G06F 21/62*    (2013.01)

(52) U.S. Cl.
CPC ...... *G06F 21/6227* (2013.01); *G06F 21/6245* (2013.01)

(58) Field of Classification Search
CPC .......................... G06F 21/6227; G06F 21/6245
USPC ........................................................... 726/1
See application file for complete search history.

(56) References Cited

U.S. PATENT DOCUMENTS

| | | |
|---|---|---|
| 6,202,066 B1 | 3/2001 | Barkley et al. |
| 6,732,113 B1 | 5/2004 | Ober et al. |
| 8,738,605 B2 | 5/2014 | Devarajan et al. |
| 9,489,376 B2 | 11/2016 | Thomason et al. |
| 9,628,493 B2 | 4/2017 | Warshavsky et al. |

(Continued)

FOREIGN PATENT DOCUMENTS

| | | |
|---|---|---|
| EP | 2663053 A2 | 11/2013 |
| WO | 2016/064470 A1 | 4/2016 |

OTHER PUBLICATIONS

"Collibra Data Governance Center," Collibra, [online], (9 pages), [Retrieved From the Internet Jun. 25, 2019] <https://www.collibra.com/data-governance-solutions/data-governance-center>.

(Continued)

*Primary Examiner* — Jeffrey C Pwu
*Assistant Examiner* — Nega Woldemariam
(74) *Attorney, Agent, or Firm* — Alston & Bird LLP

(57) ABSTRACT

Methods, systems, and apparatuses embodied herein control and track access to secured data independent of the asset storing the secured data. In this regard, some embodiments organize volumes including one or more datasets and attach one or more assets to each volume. Some embodiments further receive data permissions of use information, for example from a data steward device, for the volume and datasets, which are registered with the volume and the datasets. Some embodiments further receive a set of restrictions, retrieve the dataset permissions of use information for one or more dataset identifiers, and determine the restrictions do not conflict with the dataset permissions of use information. Some embodiments further generate, and subsequently store, an indication the set of restrictions is valid when the dataset permissions of use information does not (Continued)

conflict. Permissions of use information may be organized into persona data objects assigned to various user profiles.

24 Claims, 18 Drawing Sheets

(56) References Cited

U.S. PATENT DOCUMENTS

| | | | |
|---|---|---|---|
| 9,691,027 | B1 | 6/2017 | Sawant et al. |
| 9,785,795 | B2 | 10/2017 | Grondin et al. |
| 2003/0101341 | A1* | 5/2003 | Kettler ............... G06F 21/6245 713/162 |
| 2008/0162499 | A1 | 7/2008 | Connor et al. |
| 2013/0332194 | A1 | 12/2013 | D'Auria et al. |
| 2015/0142811 | A1 | 5/2015 | Henry |
| 2015/0161397 | A1 | 6/2015 | Cook et al. |
| 2017/0091279 | A1 | 3/2017 | Shah et al. |
| 2017/0116315 | A1 | 4/2017 | Xiong et al. |
| 2017/0124176 | A1 | 5/2017 | Beznos et al. |
| 2017/0208041 | A1 | 7/2017 | Kho et al. |
| 2017/0287029 | A1 | 10/2017 | Barday |
| 2017/0287059 | A1 | 10/2017 | Shelksohn et al. |
| 2018/0027006 | A1 | 1/2018 | Zimmermann et al. |
| 2018/0075254 | A1 | 3/2018 | Reid et al. |
| 2018/0232528 | A1* | 8/2018 | Williamson ........... G06N 5/025 |
| 2018/0309775 | A1 | 10/2018 | Zou et al. |
| 2018/0316722 | A1 | 11/2018 | Jenson |
| 2019/0258854 | A1 | 8/2019 | Hosabettu et al. |
| 2019/0361937 | A1 | 11/2019 | Rogynskyy et al. |

OTHER PUBLICATIONS

Intellectual Property Office, Intention To Grant for Great Britain Patent Application No. GB1914329.6, dated Oct. 12, 2020, (2 pages), South Wales, Great Brtiain.

NonFinal Office Action for U.S. Appl. No. 16/400,576, dated Nov. 18, 2020, (31 pages), United States Patent and Trademark Office, U.S.

Combined Search and Examination Report for Great Britain Patent Application No. 1914329.6, dated Mar. 19, 2020, (5 pages), United Kingdom Intellectual Property Office, Oslo, Norway.

Notice of Allowance and Fee(s) Due for U.S. Appl. No. 16/400,476, dated Mar. 19, 2021, (17 pages), United States Patent and Trademark Office, US.

Corrected Notice of Allowability for U.S. Appl. No. 16/400,476, dated Jun. 3, 2021, (7 pages), United States Patent and Trademark Office, USA.

International Searching Authority, International Search Report and Written Opinion for International Application No. PCT/US2021/022835, dated Jun. 7, 2021, (14 pages), European Patent Office, Rijswijk, Netherlands.

International Searching Authority, International Search Report and Written Opinion for International Application No. PCT/US2021/022850, dated Jun. 7, 2021, (16 pages), European Patent Office, Rijswijk, Netherlands.

* cited by examiner

DATASET DETAILS

1200

| PRODUCTION DATASET NAME | PRODUCTION DATASET DESCRIPTION | DATASET CODE | | DATASET PUBLISH DATE | | X CANCEL | SAVE AS DRAFT | PUBLISH |
|---|---|---|---|---|---|---|---|---|
| XXXXX SHIP | XXXXXX SHIP | XXXXX | | XXXXX | | | | |

DATASET CONSUMPTION ROLES

| IT OWNER | DATA STEWARD | | | DATASET INGESTION ROLES |
|---|---|---|---|---|
| | | | | BUSINESS OWNER / INFORMATION OWNER |

VOLUME
VOLUME TITLE
NO RECORDS AVAILABLE!

DESCRIPTION

ATTACHED ASSETS

DATA TRACKING

ENTITY                                                    RECORD COUNT [ 0 ]         DOMAINS

- ☐ BUSINESS SEGMENT 1          LINE OF BUSINESSES                              ☐ DOMAIN 1
- ☐ BUSINESS SEGMENT 2          ☐ LINE OF BUSINESS 1                            ☐ DOMAIN 2
- ☐ BUSINESS SEGMENT 3          ☐ LINE OF BUSINESS 2                            ☐ DOMAIN 3
                                 ☐ LINE OF BUSINESS 3                            ☐ DOMAIN 4
                                 ☐ LINE OF BUSINESS 4                            ☐ DOMAIN 5
                                 ☐ LINE OF BUSINESS 5                            ☐ DOMAIN 6
                                 ☐ LINE OF BUSINESS 6

☐ HEALTHCARE HC
BUSINESS SEGMENT                LINE OF BUSINESSES

- ☐ BUSINESS SEGMENT 1          ☐ LINE OF BUSINESS 1                            INTERNAL SENSITIVITY
- ☐ BUSINESS SEGMENT 2          ☐ LINE OF BUSINESS 2                            CONTAINS EMPLOYEE DATA
- ☐ BUSINESS SEGMENT 3
- ☐ BUSINESS SEGMENT 4
- ☐ BUSINESS SEGMENT 5

VOLUME DETAILS

| PRODUCTION VOLUME NAME | PRODUCTION VOLUME DESCRIPTION | METADATA ID | | VOLUME PUBLISH DATE | | | |
|---|---|---|---|---|---|---|---|
| XX-XXXX SHIP | XX-XXXX SHIP | XXXXX | | XXXXX | X CANCEL | SAVE AS DRAFT | PUBLISH |

VOLUME CONSUMPTION ROLES

| IT OWNER | DATA STEWARD | | | VOLUME INGESTION ROLES BUSINESS OWNER | | INFORMATION OWNER |
|---|---|---|---|---|---|---|
| OWNER 1 | DATA STEWARD 1 | | | BUSINESS OWNER 1 | | INFORMATION OWNER 1 |

VOLUME

VOLUME TITLE | DESCRIPTION | ATTACHED ASSETS
NO RECORDS AVAILABLE!

ASSETS

| ASSET NAME | ASSET ID | ACCESS PROVISION | VALIDATION | | |
|---|---|---|---|---|---|
| ASSET NAME 1 | XXXXXXX | OTHER | NOT COMPLETE | | |
| | | | KEY CONTROLS | X | |
| | | | KEY CONTROLS | X | |
| | | | KEY CONTROLS | X | |

|◄|◄| 1 |►|►| PAGE SIZE 5 ▼

DATASETS

| ID | NAME | DATE PUBLISHED | DATA STEWARD | DGTS RECORDS COUNT | DATA CLASSIFICATION | |
|---|---|---|---|---|---|---|
| XXXXXXXXXXX | DST 1 | 12/14/1817 2:48:54 | DATA STEWARD 1 | 0 | PROTECTED | X |
| XXXXXXXXXXX | DST 2 | 12/15/1817 6:15:27 | DATA STEWARD 2 | 0 | PROTECTED | X |

|◄|◄| 1 |►|►| PAGE SIZE 5 ▼

ATTACH ASSET

ID NUMBER
[XXXXXXXXXX          X]

FORMAL NAME
[FORMAL NAME 1          ]

BUSINESS OWNER
[BUSINESS OWNER 1          ]

IT OWNER
[IT OWNER 1          ]

ACCESS PROVISION
[OTHER          ]

MANAGE PERMISSIONS-DATASET

| PRODUCTION VOLUME/DATASET TITLE | DATA | PRODUCTION VOLUME/DATASET DESCRIPTION | | | | | | |
|---|---|---|---|---|---|---|---|---|
| XXXXXXXXXXXXXXX | XXXXXXXXXXXXXXX | XXXXXXX | | | | | | |
| ROLE | ASSET | PERMISSIONS STATUS | PERMISSIONS PUBLISH DATA | ALLOWED ACCOUNTS | ENVIRONMENT | PROTECTION CONSUMPTION PROFILE | TIME LIMIT | OFFSHORE | RECORD AUTH |
| ROLE 1 | ASSET 1 | | | ALLOWED | PRODUCTION | | | | |

|◄|◄|1|►|►| PAGE SIZE [5 ▼]    0 ITEMS IN 1 PAGES

[REFRESH]                                                          [+ ADD PERMISSION]

PERMISSIONS OF USE DETAILS (REFRESH REQUIRED AFTER EDIT)

| GROUP ROLE | VOLUME | ASSETS | PERMISSION PUBLISH DATE |
|---|---|---|---|
| GROUP ROLE 1 | VOLUME 1 | ASSET 1 | DATE |

ALLOWED CONSUMPTION

ALLOWED CONSUMPTION      ALLOWED ENVIRONMENTS
[ALLOWED ACCOUNT TYPE]   [NON PRODUCTION]

| ALLOWED ACCESS | ALLOWED USE | USE JUSTIFICATION |
|---|---|---|
| ALLOWED ACCESS 1 | ALLOWED USE 1 | USE JUSTIFICATION 1 |
| ALLOWED ACCESS 2 | ALLOWED USE 2 | USE JUSTIFICATION 2 |
| ALLOWED ACCESS 3 | ALLOWED USE 3 | USE JUSTIFICATION 3 |

| OFFSHORE ALLOWED | PROTECTION CONSUMPTION PROFILE | RECORD AUTHORIZATION |
|---|---|---|
| OFFSHORE | ALL VALUES CLEAR | RECORD AUTHORIZATION ENGINE |

DATA USE AND RIGHTS
MANUAL ENTRY
[MANUAL ENTRY 1]

[ADD] [DELETE]

| DUR# | START ACCESS | END ACCESS |
|---|---|---|
| NO ACCESS AVAILABLE | | |

LEARNED SOURCE
COURSE NAME [         ]   COURSE LINK [         ]

PROPER USE LOOKUP - PROVISION GUIDANCE

SEARCH AND AND

| ROLE ▼ | | ROLE ▼ | | ROLE ▼ | | X CLEAR |

| ROLE | ASSET | CNTRL LEVEL | ALLOWED ACCOUNTS | ENVIRONMENT | PROTECTION CONSUMPTION PROFILE | TIME LIMITED | OFFSHORE | RECORD AUTH. |
|---|---|---|---|---|---|---|---|---|
| ROLE 1 | ASSET 1 | VOLUME | END USER | PRODUCTION | PROFILE 1 | YES | ALLOWED | RECORD AUTH. 1 |
| ROLE 2 | ASSET 2 | VOLUME | END USER | PRODUCTION | PROFILE 2 | YES | ALLOWED | RECORD AUTH. 1 |
| ROLE 3 | ASSET 3 | VOLUME | END USER | PRODUCTION | PROFILE 3 | YES | ALLOWED | RECORD AUTH. 1 |
| ROLE 4 | ASSET 4 | VOLUME | END USER | PRODUCTION | PROFILE 4 | YES | ALLOWED | RECORD AUTH. 1 |
| ROLE 5 | ASSET 5 | VOLUME | END USER | PRODUCTION | PROFILE 5 | YES | ALLOWED | RECORD AUTH. 1 |

|◄ ◄ 1 ► ►| PAGE SIZE 5 ▼           0 ITEMS IN 1 PAGES

SELECTED ROLES GRANTED CONTENT

| ROLE | PRODUCTION VOLUME | | METADATA ID | PRODUCTION VOLUME DESCRIPTION |
|---|---|---|---|---|
| XXXXXX | XXXXX | | XXXXXX | VOLUME FOR TEST |

| ATTACHED DATASETS | NAME | DATA CLASSIFICATION | BUISNESS | SEGMENT | LINE OF BUSINESS |
|---|---|---|---|---|---|
| DATASETS 1 | NAME 1 | DATA CLASSIFICATION 1 | BUSINESS 1 | SEGMENT 1 | LINE OF BUSINESS 1 |
| DATASETS 2 | NAME 2 | DATA CLASSIFICATION 2 | BUSINESS 2 | SEGMENT 2 | LINE OF BUSINESS 2 |
| DATASETS 3 | NAME 3 | DATA CLASSIFICATION 3 | BUSINESS 3 | SEGMENT 3 | LINE OF BUSINESS 3 |

APPROVED DATA USE AND RIGHTS | ALLOWED CONSUMPTIONS | ALLOWED JUSTIFICATIONS

| DUR# | START ACCESS | END ACCESS |
|---|---|---|
| XXXXXXX | DATE | AGGREGATION |

| ALLOWED ACCESS | ALLOWED USE |
|---|---|
| DISCOVERY | ALLOWED USE |

| USE JUSTIFICATIONS |
|---|
| TREATMENT |

| DATA USE - CUSTOMER CONTRACTIONAL OBLIGATIONS AND SUMMARY (RESTRICTIONS EXIST) |
|---|
| RESTRICTION 1 |
| RESTRICTION 2 |
| RESTRICTION 3 |
| RESTRICTION 4 |
| RESTRICTION 5 |
| RESTRICTION 6 |
| RESTRICTION 7 |

DIPOSITON SHOWN: GRAND SUMMARY
NOT PERMITTED OR RESTRICTED

| CUSTOMER NAME | CMDM ID |
|---|---|
| CUSTOMER 1 | |
| CUSTOMER 2 | |
| CUSTOMER 3 | |
| CUSTOMER 4 | |
| CUSTOMER 5 | |
| CUSTOMER 6 | |
| CUSTOMER 7 | |

RECORD COUNT XXXXXXX
PERMITTED

| CUSTOMER NAME | CMDM ID |
|---|---|
| CUSTOMER 1 | |
| CUSTOMER 2 | |
| CUSTOMER 3 | |
| CUSTOMER 4 | |
| CUSTOMER 5 | |
| CUSTOMER 6 | |
| CUSTOMER 7 | |

PERSONA DETAIL

| PERSONA NAME | PERSONA DESCRIPTION | PERSONA CODE | PERSONA PUBLISH DATE | X CLOSE | SAVE AS DRAFT | PUBLISH |
|---|---|---|---|---|---|---|
| TEST PERSONA | | XXXXXXXXXX | | | | |

ALLOWED USAGE (MATCH PERMISSIONS OF USE)

| ALLOWED ENVIRONMENTS | PROTECTION CONSUMPTION PROFILE (OPTIONAL) | RECORD AUTHORIZATION (OPTIONAL) |
|---|---|---|
| NON-PRODUCTION ▽ | PILL ▽ | NO RECORD ENFORCEMENT ▽ |

| ALLOWED ACCESSES (BASED ON ACNT.) | ALLOWED USE (BASED ON ALLOWED ACCESS) | USE JUSTIFICATION |
|---|---|---|
| ☑ CUSTOMER 1 | ☑ CUSTOMER 1 | ☑ CUSTOMER 1<br>☑ CUSTOMER 2<br>☑ CUSTOMER 3<br>☑ CUSTOMER 4 |

POSITION PROFILE (MATCH USER IDENTITY)

| MARKET | ○ MATCH ON BUSINESS SEGMENT | ○ MATCH ON LINE OF BUSINESS | ○ MATCH ON DOMAIN |
|---|---|---|---|
| ☑ MARKET 1<br>☑ MARKET 2<br>☐ MARKET 3 | BUSINESS SEGMENT - EXTERNAL<br>☑ BUSINESS SEGMENT 1<br>☑ BUSINESS SEGMENT 2<br>☐ BUSINESS SEGMENT 3 | LINES OF BUSINESS<br>☑ LINES OF BUSINESS 1<br>☑ LINES OF BUSINESS 2<br>☐ LINES OF BUSINESS 3<br>☐ LINES OF BUSINESS 4<br>☑ LINES OF BUSINESS 5<br>☐ LINES OF BUSINESS 6 | DOMAIN/SUBJECT AREA<br>☑ DOMAIN 1<br>☑ DOMAIN 2<br>☐ DOMAIN 3<br>☐ DOMAIN 4<br>☑ DOMAIN 5<br>☐ DOMAIN 6 |

ALLOWED DATA (MATCH DATA IDENTITY)

| ○ ALLOW OTHER MARKETS | ○ ALLOW OTHER BUSINESS SEGMENTS | ○ ALLOW OTHER LINES OF BUSINESS | ○ ALLOW OTHER DOMAINS |
|---|---|---|---|
| MARKET<br>☑ MARKET 1<br>☑ MARKET 2 | BUSINESS SEGMENT - EXTERNAL<br>☑ BUSINESS SEGMENT 1<br>☑ BUSINESS SEGMENT 2<br>☐ BUSINESS SEGMENT 3 | LINES OF BUSINESS<br>☑ LINES OF BUSINESS 1<br>☑ LINES OF BUSINESS 2<br>☐ LINES OF BUSINESS 3<br>☐ LINES OF BUSINESS 4<br>☑ LINES OF BUSINESS 5<br>☐ LINES OF BUSINESS 6 | DOMAIN/SUBJECT AREA<br>☑ DOMAIN 1<br>☑ DOMAIN 2<br>☐ DOMAIN 3<br>☐ DOMAIN 4<br>☑ DOMAIN 5<br>☐ DOMAIN 6 |
| ○ ALLOW EMPLOYEE DATA | | | |

MY DATA RIGHTS

| FULL NAME: | MSID: | MARKET GROUP: |
| TITLE: | EMPLOYEE ID: | EXTERNAL SEGMENT: |
| COUNTRY: | ONSHORE/OFFSHORE  UNDEFINED | INTERNAL SEGMENT: |
| LOCATION: | EMPLOYEE/CONTRACTOR | BUSINESS: |
| | REGULAR/TEMP | DIVISION: |

SELECTION GRID

| FILTER | | AND | | AND | | |
|---|---|---|---|---|---|---|
| ROLE ▽ | | ROLE ▽ | | ROLE ▽ | | X CLEAR |

| ROLE | ASSET | COI LEVEL | ALLOWED ACCOUNTS | ENVIRONMENT | PROTECTION CONSUMPTION PROFILE | TIME LIMITED DURS | OFFSHORE | RECORD AUTH |

|◄ ◄ 1 ► ►|  PAGE SIZE  5    0 ITEMS IN 1 PAGES

SELECTION ROLE'S GRANTED CONTENT

| ROLE | PRODUCTION VOLUME | | METADATA ID | PRODUCTION VOLUME DESCRIPTION |

ATTACHED DATA SHEETS

| DATASET ID | NAME | DATA CLASSIFICATION |
|---|---|---|
| NO RECORDS AVAILABLE! | | |

BUSINESS

| MARKET | SEGMENT | LINE OF BUSINESS |
|---|---|---|
| NO RECORDS AVAILABLE! | | |

APPROVED DATA USE AND RIGHTS (DURS)

| DUR# | START ACCESS | END ACCESS |
|---|---|---|
| NO RECORDS AVAILABLE! | | |

ALLOWED CONSUMPTIONS

| ALLOWED ACCESS | ALLOWED ACCESS |
|---|---|
| NO RECORDS AVAILABLE! | |

ALLOWED CONSUMPTIONS

| USE JUSTIFICATION |
|---|
| NO RECORDS AVAILABLE! |

FIG. 18

METHODS, APPARATUSES, AND SYSTEMS FOR DATA RIGHTS TRACKING

CROSS-REFERENCE TO RELATED APPLICATIONS

This application claims priority to U.S. Provisional Application No. 62/742,214 filed Oct. 5, 2018, the content of which is incorporated herein by reference in its entirety.

TECHNOLOGICAL FIELD

Example embodiments of the present disclosure relate to controlling and tracking access to data in a computing system.

BACKGROUND

Data governance is a capability that ensures important data sets are governed and secured properly. The key to data governance is identifying what data sets are being accessed, where data sets are being accessed from, why data sets are being accessed and who or what entity is accessing the data sets. Legal, regulatory or contractual obligations apply to data regardless of the technology storing, processing or transmitting data. However, existing data governance methods are designed for individual technological assets that store, transmit, process the data, and not for the data set itself. Therefore, existing data governance methods often do not effectively provide a desired security level for sensitive data.

SUMMARY

In general, embodiments of the present disclosure provided herein include systems, methods, apparatuses, and computer program products for controlling and tracking access to data. It should be appreciated that, in embodiments, computer-implemented methods may be provided via systems, apparatuses, and/or computer program products including specially configured means for steps of the computer-implemented methods.

In accordance with one aspect of the present disclosure, a computer-implemented method for controlling and tracking access to secured data is provided. In example embodiments, the computer-implemented method is implemented using any of a myriad of solutions configured via software, hardware, or a combination thereof, including any number of known computing devices. In at least one example embodiment, the method includes receiving, using processing circuitry and from a remote computing device, a dataset identifier. The example method further includes organizing, using the processing circuitry, a dataset represented by the dataset identifier into one or more volumes, each of the one or more volumes associated with a unique volume identifier. The example method further includes attaching, using the processing circuitry, one or more assets to the one or more volumes by associating one or more asset identifiers with the one or more volume identifiers, wherein each asset is configured to store at least one of the one or more volumes. The example method further includes receiving, using the processing circuitry and from a data steward device, dataset permissions of use information associated with the dataset identifier. The example method further includes registering, using the processing circuitry and in a repository, the dataset permissions of use information with the dataset by associating a dataset permissions of use information identifier associated with the dataset permissions of use information with the dataset identifier. The example method further includes registering, using the processing circuitry and in the repository, volume permissions of use information with the one or more volumes by associating a volume permissions of use information identifier associated with the volume permissions of use information with the one or more volume identifiers. The example method further includes receiving, using the processing circuitry and from the remote computing device, a set of restrictions associated with the dataset identifier. The example method further includes retrieving, using the processing circuitry and from the repository, dataset permissions of use information associated with the dataset identifier. The example method further includes determining, using the processing circuitry, by comparing the set of restrictions with the dataset permissions of use information, that the set of restrictions does not conflict with the dataset permissions of use information. The example method further includes generating and storing an indication that the set of restrictions is validated.

In some example embodiments of the method, the set of restrictions comprises one or more of a set of contractual restrictions, a set of customer committed restrictions and a set of legal restrictions. Additionally or alternatively, in some example embodiments of the method, the volume permissions of use information comprises one or more of allowed account types, allowed environments, allowed use, allowed use justifications, indication of offshore allowed, or protection consumption profile. Additionally or alternatively, in some example embodiments of the method, the data permissions of use information comprises one or more of: allowed account types, allowed environments, allowed use, allowed use justifications, indication of offshore allowed, or protection consumption profile.

In some example embodiments of the method, organizing the dataset into the one or more volumes comprises receiving, using the processing circuitry, a volume identifier data structure associated with one or more volumes; generating, using the processing circuitry, volume metadata comprising one or more dataset identifiers, indicating that datasets associated with the one or more dataset identifiers belong to the one or more volumes; and storing, using the processing circuitry and in the repository, the volume metadata.

In some example embodiments of the method, attaching the one or more assets to the one or more volumes comprises receiving, using the processing circuitry, an asset registration data structure associated with one or more assets; storing, using the processing circuitry and in the repository, one or more datasets associated with each of the one or more volumes in the one or more assets based on the asset registration data structure; generating, using the processing circuitry, asset metadata indicating that the one or more datasets of each of the one or more volumes is stored in the one or more assets; and storing, using the processing circuitry and in the repository, the asset metadata.

In some example embodiments of the method, registering the dataset permissions of use information regarding the dataset comprises receiving, using the processing circuitry, dataset permissions of use information from a data steward device, wherein a data steward associated with the data steward device is designated by an owner of the dataset; generating, using the processing circuitry, dataset permissions of use metadata based on the dataset permissions of use information; and storing, using the processing circuitry and in the repository, the dataset permissions of use metadata.

In some example embodiments of the method, registering volume permissions of use information regarding the one or more volumes to the one or more volumes comprises receiving, using the processing circuitry, volume permissions of use information from a data steward device, wherein a data steward associated with the data steward device is designated by an owner of the dataset; generating, using the processing circuitry, volume permissions of use metadata based on the volume permissions of use information; and storing, using the processing circuitry and in the repository, the volume permissions of use metadata.

In some example embodiments of the method, the method further comprises receiving, using the processing circuitry, one or more data attributes associated with the dataset from a metadata repository; receiving, using the processing circuitry, one or more data attribute protection policies associated with the one or more data attributes; and enforcing, using the processing circuitry, the one or more data attribute protection policies associated with the one or more data attributes by transmitting the one or more data attribute protection policies to a data protection system, wherein the data protection system is configured to enforce the one or more data attribute protection policies on the one or more assets.

In accordance with another aspect of the present disclosure, an apparatus for controlling and tracking access to secured data is provided. In at least one example embodiment, the apparatus includes at least one processor and at least one memory. The at least one memory includes computer-coded instructions stored thereon. The computer-coded instructions, in execution with the at least one processor, configure the apparatus to receive, from a remote computing device, a dataset identifier. The example apparatus is further configured to organize a dataset represented by the dataset identifier into one or more volumes, each of the one or more volumes associated with a unique volume identifier. The example apparatus is further configured to attach one or more assets to the one or more volumes by associating one or more asset identifiers with the one or more volume identifiers, wherein each asset is configured to store at least one of the one or more volumes. The example apparatus is further configured to receive, from a data steward device, dataset permissions of use information associated with the dataset identifier. The example apparatus is further configured to register, in a repository, the dataset permissions of use information with the dataset by associating a dataset permissions of use information identifier associated with the dataset permissions of use information with the dataset identifier. The example apparatus is further configured to register, in the repository, volume permissions of use information with the one or more volumes by associating a volume permissions of use information identifier associated with the volume permissions of use information with the one or more volume identifiers. The example apparatus is further configured to receive, from the remote computing device, a set of restrictions associated with the dataset identifier. The example apparatus is further configured to retrieve, from the repository, dataset permissions of use information associated with the dataset identifier. The example apparatus is further configured to determine, by comparing the set of restrictions with the dataset permissions of use information, that the set of restrictions does not conflict with the dataset permissions of use information. The example apparatus is further configured to generate and store, in the repository, an indication that the set of restrictions is validated.

In some example embodiments of the apparatus, the set of restrictions comprises one or more of a set of contractual restrictions, a set of customer committed restrictions and a set of legal restrictions. Additionally or alternatively in some example embodiments of the apparatus, the volume permissions of use information comprises one or more of: allowed account types, allowed environments, allowed use, allowed use justifications, indication of offshore allowed, or protection consumption profile. Additionally or alternatively in some example embodiments of the apparatus, the data permissions of use information comprises one or more of: allowed account types, allowed environments, allowed use, allowed use justifications, indication of offshore allowed, or protection consumption profile.

In some example embodiments of the apparatus, to organize the dataset into the one or more volumes, the apparatus is configured to receive, using the processing circuitry, a volume identifier data structure associated with one or more volumes; generate, using the processing circuitry, volume metadata comprising one or more dataset identifiers, indicating that datasets associated with the one or more dataset identifiers belong to the one or more volumes; and store, using the processing circuitry and in the repository, the volume metadata.

In some example embodiments of the apparatus, to attach the one or more assets to the one or more volumes, the apparatus is configured to receive, using the processing circuitry, an asset registration data structure associated with one or more assets; store, using the processing circuitry and in the repository, one or more datasets associated with each of the one or more volumes in the one or more assets based on the asset registration data structure; generate, using the processing circuitry, asset metadata indicating that the one or more datasets of each of the one or more volumes is stored in the one or more assets; and store, using the processing circuitry and in the repository, the asset metadata.

In some example embodiments of the apparatus, to register the dataset permissions of use information regarding the dataset, the apparatus is configured to receive, using the processing circuitry, dataset permissions of use information from a data steward device, wherein a data steward associated with the data steward device is designated by an owner of the dataset; generate, using the processing circuitry, dataset permissions of use metadata based on the dataset permissions of use information; and store, using the processing circuitry and in the repository, the dataset permissions of use metadata.

In some example embodiments of the apparatus, to register the volume permissions of use information regarding the one or more volumes to the one or more volumes, the apparatus is configured to receive, using the processing circuitry, volume permissions of use information from a data steward device, wherein a data steward associated with the data steward device is designated by an owner of the dataset; generate, using the processing circuitry, volume permissions of use metadata based on the volume permissions of use information; and store, using the processing circuitry and in the repository, the volume permissions of use metadata.

In some example embodiments of the apparatus, the apparatus is further configured to receive, using the processing circuitry, one or more data attributes associated with the dataset from a metadata repository; receive, using the processing circuitry, one or more data attribute protection policies associated with the one or more data attributes; and enforce, using the processing circuitry, the one or more data attribute protection policies associated with the one or more data attributes by transmitting the one or more data attribute protection policies to a data protection system, wherein the data protection system is configured to enforce the one or more data attribute protection policies on the one or more assets.

In accordance with another aspect of the present disclosure, a computer program product for controlling and tracking access to secured data is provided. In at least one example embodiment of the computer program product, the computer program product includes at least one non-transitory computer-readable storage medium having computer program instructions thereon. The computer program instructions, in execution with at least one processor, are configured to receive, from a remote computing device, a dataset identifier. The example computer program product is further configured to organize a dataset represented by the dataset identifier into one or more volumes, each of the one or more volumes associated with a unique volume identifier. The example computer program product is further configured to attach one or more assets to the one or more volumes by associating one or more asset identifiers with the one or more volume identifiers, wherein each asset is configured to store at least one of the one or more volumes. The example computer program product is further configured to receive, from a data steward device, dataset permissions of use information associated with the dataset identifier. The example computer program product is further configured to register, in a repository, the dataset permissions of use information with the dataset by associating a dataset permissions of use information identifier associated with the dataset permissions of use information with the dataset identifier. The example computer program product is further configured to register, in the repository, volume permissions of use information with the one or more volumes by associating a volume permissions of use information identifier associated with the volume permissions of use information with the one or more volume identifiers. The example computer program product is further configured to receive, from the remote computing device, a set of restrictions associated with the dataset identifier. The example computer program product is further configured to retrieve, from the repository, dataset permissions of use information associated with the dataset identifier. The example computer program product is further configured to determine, by comparing the set of restrictions with the dataset permissions of use information, that the set of restrictions does not conflict with the dataset permissions of use information. The example computer program product is further configured to generate and store, in the repository, an indication that the set of restrictions is validated.

In some example embodiments of the computer program product, the set of restrictions comprises one or more of a set of contractual restrictions, a set of customer committed restrictions and a set of legal restrictions. Additionally or alternatively in some example embodiments of the computer program product, the volume permissions of use information comprises one or more of: allowed account types, allowed environments, allowed use, allowed use justifications, indication of offshore allowed, or protection consumption profile. Additionally or alternatively in some example embodiments of the computer program product, the data permissions of use information comprises one or more of allowed account types, allowed environments, allowed use, allowed use justifications, indication of offshore allowed, or protection consumption profile.

In some example embodiments of the computer program product, to organize the dataset into the one or more volumes, the computer program product is configured to receive, using the processing circuitry, a volume identifier data structure associated with one or more volumes; generate, using the processing circuitry, volume metadata comprising one or more dataset identifiers, indicating that datasets associated with the one or more dataset identifiers belong to the one or more volumes; and store, using the processing circuitry and in the repository, the volume metadata.

In some example embodiments of the computer program product, to attach the one or more assets to the one or more volumes, the computer program product is configured to receive, using the processing circuitry, an asset registration data structure associated with one or more assets; store, using the processing circuitry and in the repository, one or more datasets associated with each of the one or more volumes in the one or more assets based on the asset registration data structure; generate, using the processing circuitry, asset metadata indicating that the one or more datasets of each of the one or more volumes is stored in the one or more assets; and store, using the processing circuitry and in the repository, the asset metadata.

In some example embodiments of the computer program product, to register the dataset permissions of use information regarding the dataset, the computer program product is configured to receive, using the processing circuitry, dataset permissions of use information from a data steward device, wherein a data steward associated with the data steward device is designated by an owner of the dataset; generate, using the processing circuitry, dataset permissions of use metadata based on the dataset permissions of use information; and store, using the processing circuitry and in the repository, the dataset permissions of use metadata.

In some example embodiments of the computer program product, to register the volume permissions of use information regarding the one or more volumes to the one or more volumes, the computer program product is configured to receive, using the processing circuitry, volume permissions of use information from a data steward device, wherein a data steward associated with the data steward device is designated by an owner of the dataset; generate, using the processing circuitry, volume permissions of use metadata based on the volume permissions of use information; and store, using the processing circuitry and in the repository, the volume permissions of use metadata.

In some example embodiments of the computer program product, the computer program product is further configured to receive, using the processing circuitry, one or more data attributes associated with the dataset from a metadata repository; receive, using the processing circuitry, one or more data attribute protection policies associated with the one or more data attributes; and enforce, using the processing circuitry, the one or more data attribute protection policies associated with the one or more data attributes by transmitting the one or more data attribute protection policies to a data protection system, wherein the data protection system is configured to enforce the one or more data attribute protection policies on the one or more assets.

The above summary is provided merely for purposes of summarizing some example embodiments to provide a basic understanding of some aspects of the disclosure. Accordingly, it will be appreciated that the above described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Figure 1:
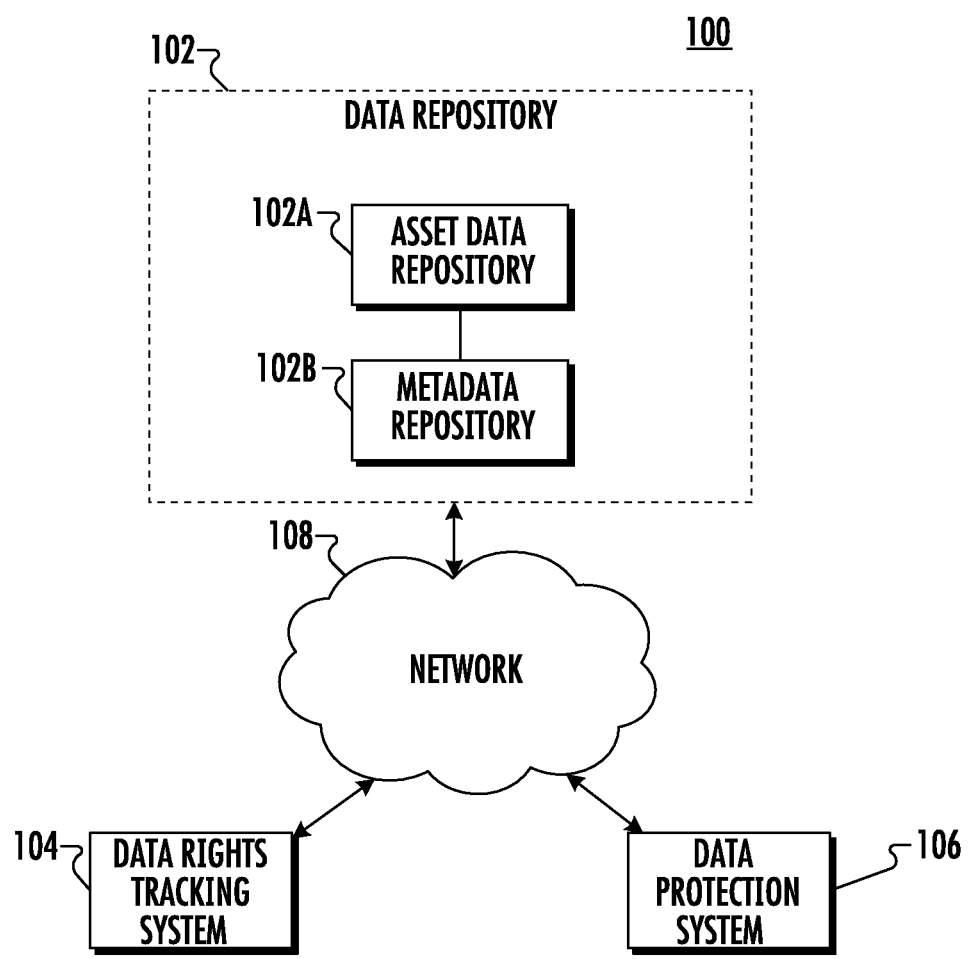
Figure 2:
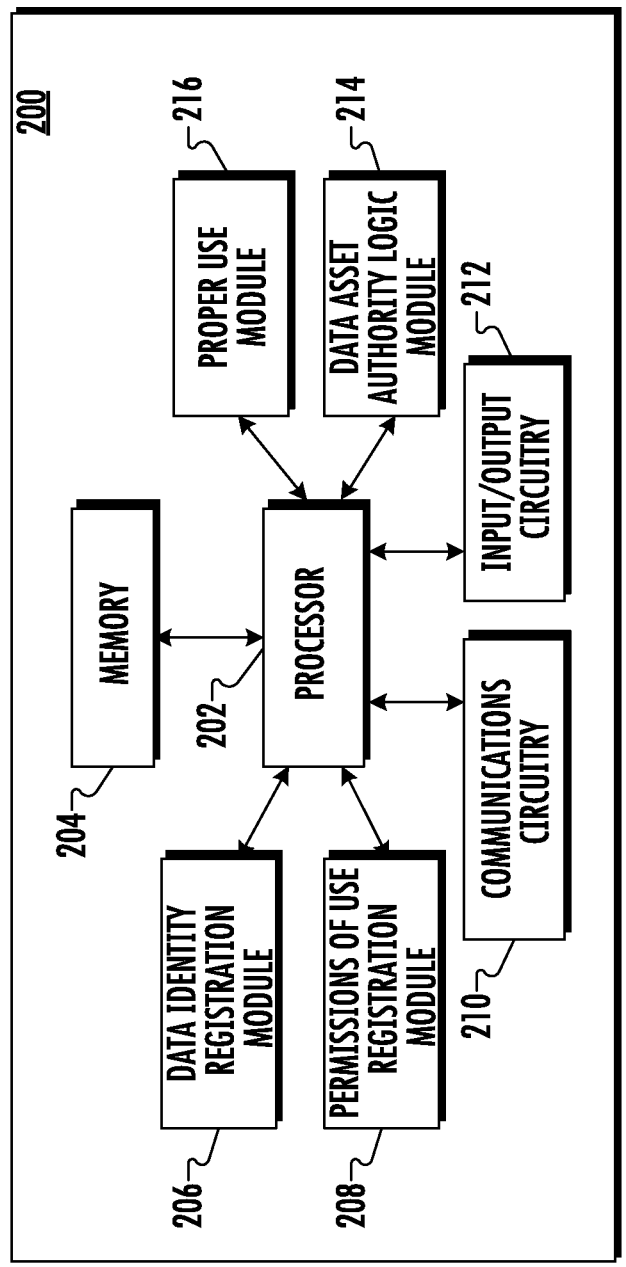
Figure 3:
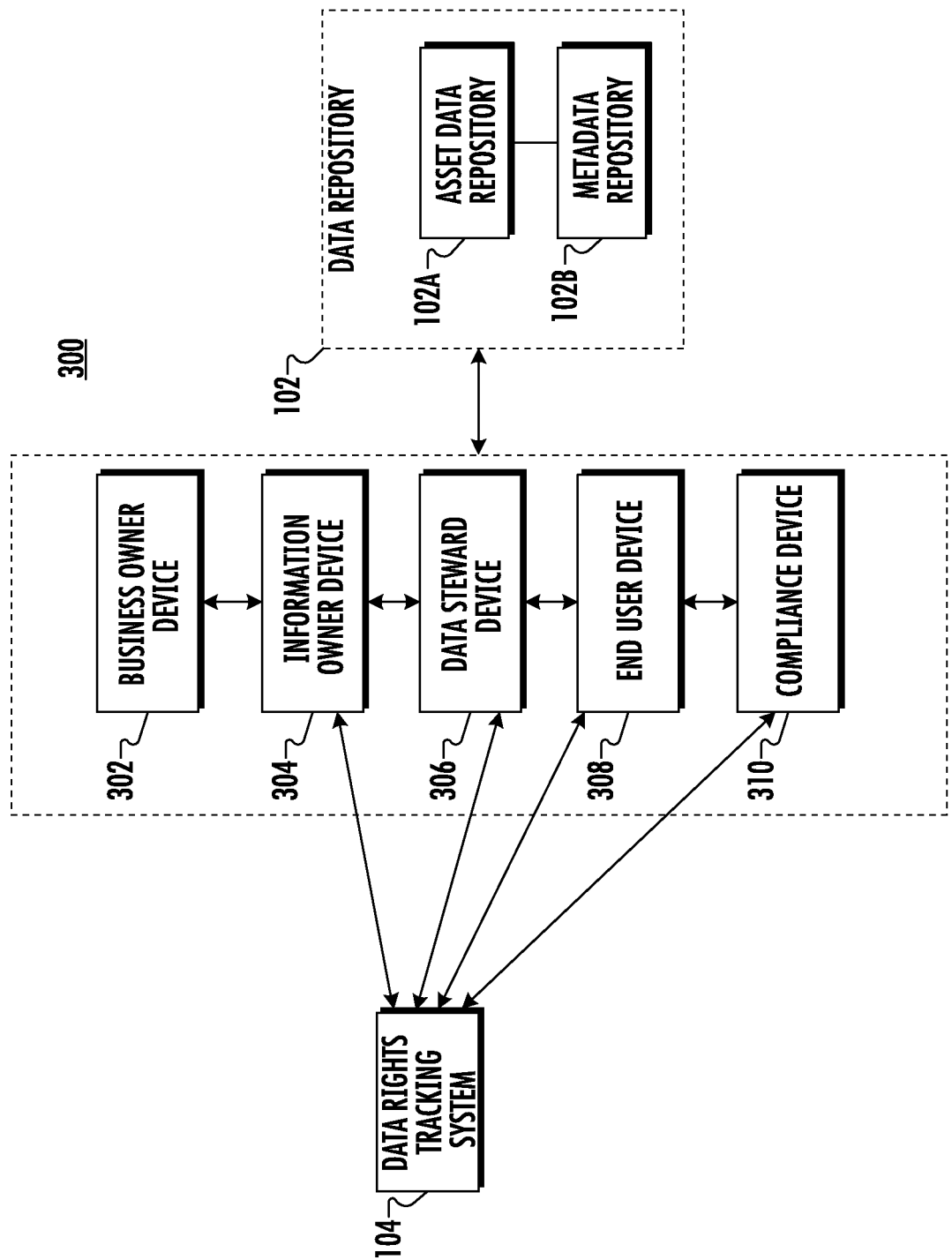
Figure 4:
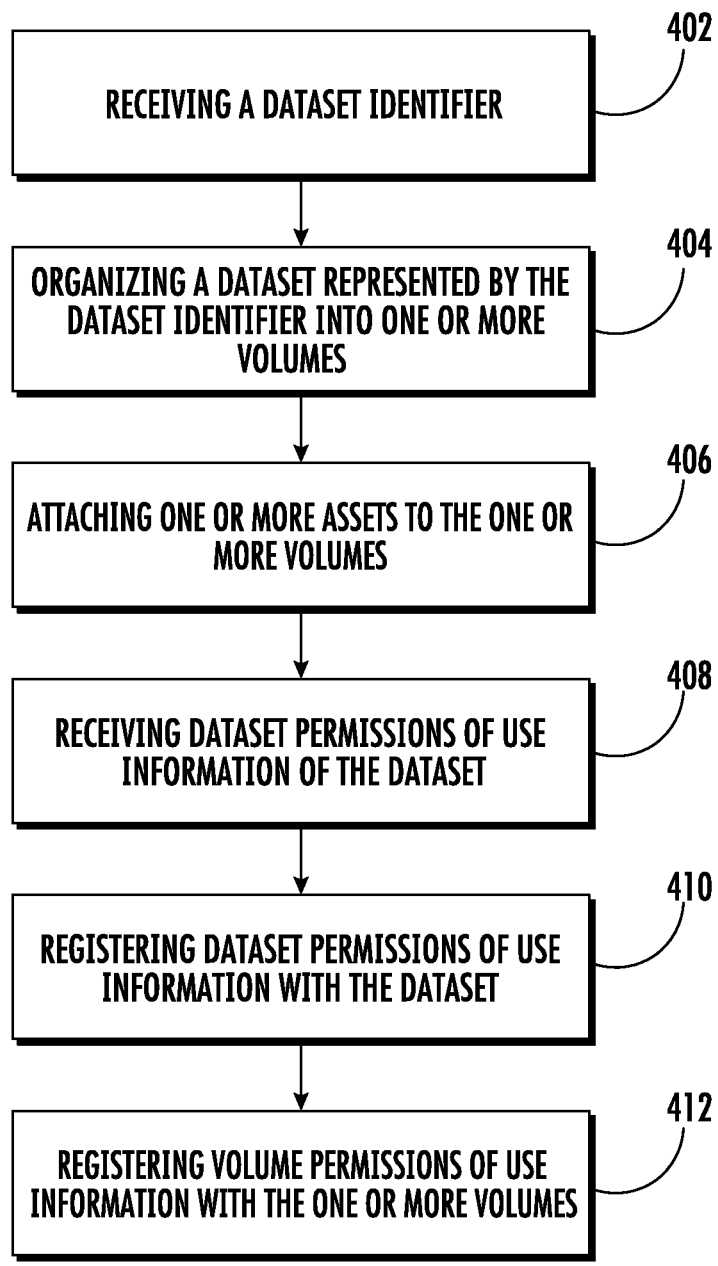
Figure 5:
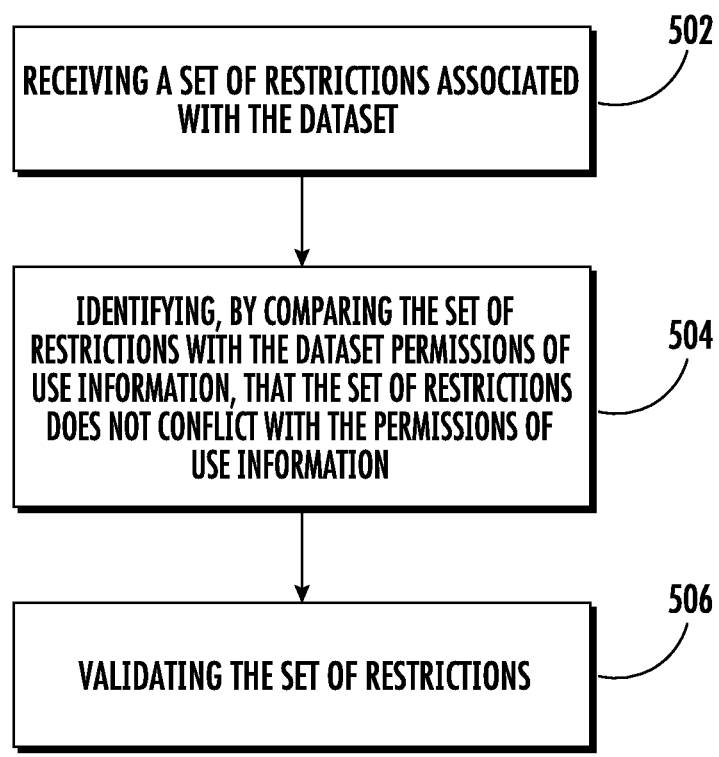
Figure 6:
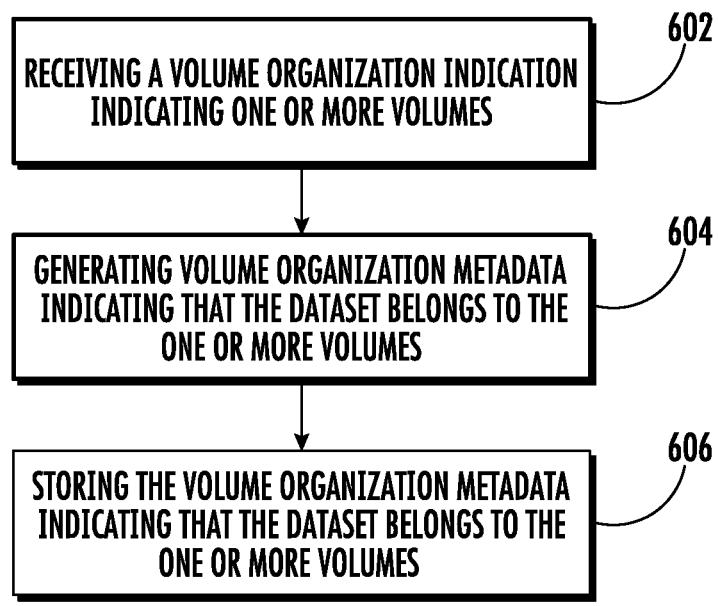
Figure 7:
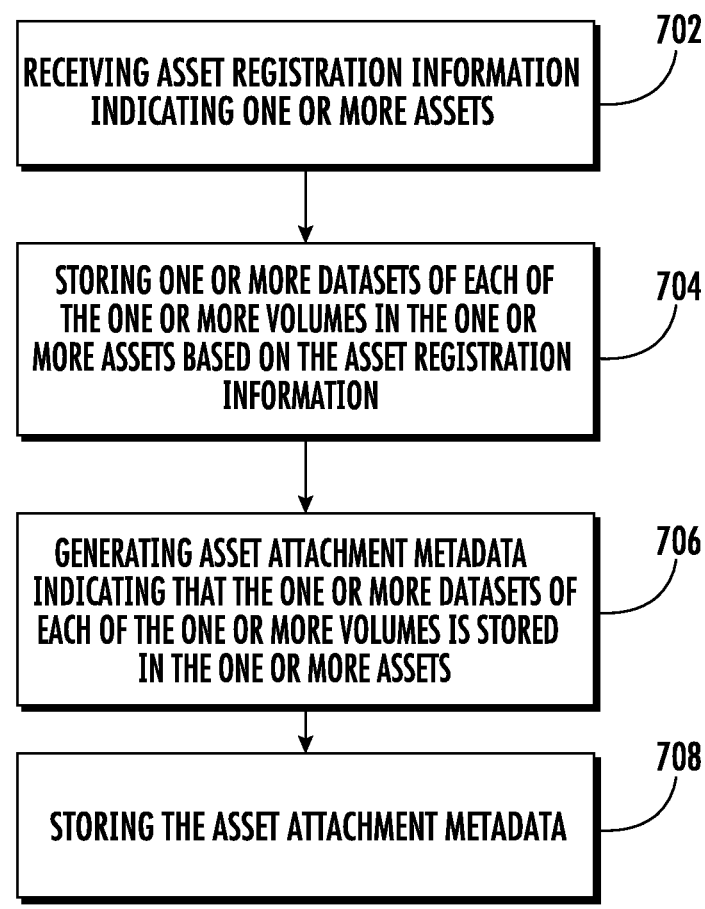
Figure 8:
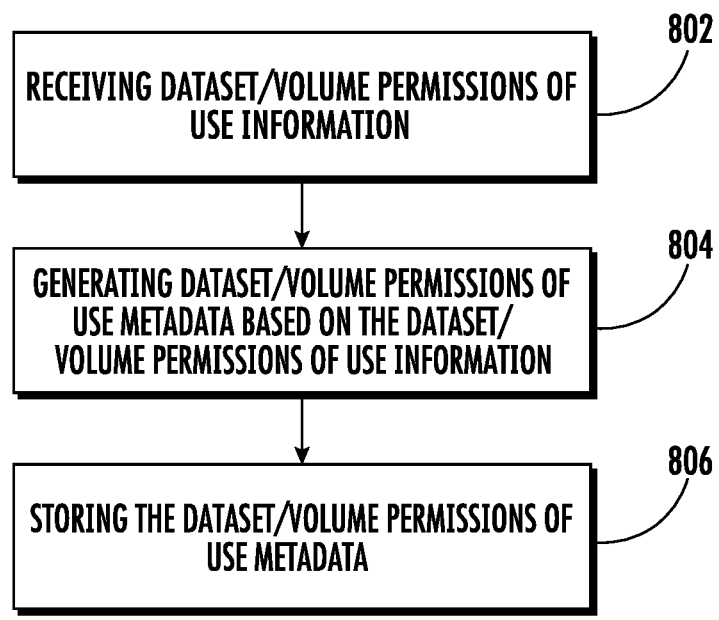
Figure 9:
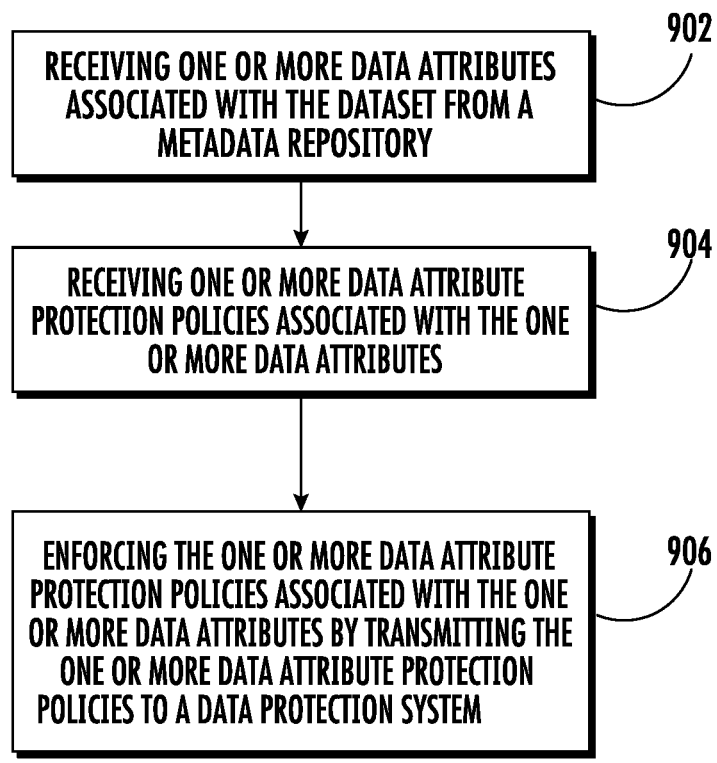
Figure 10:
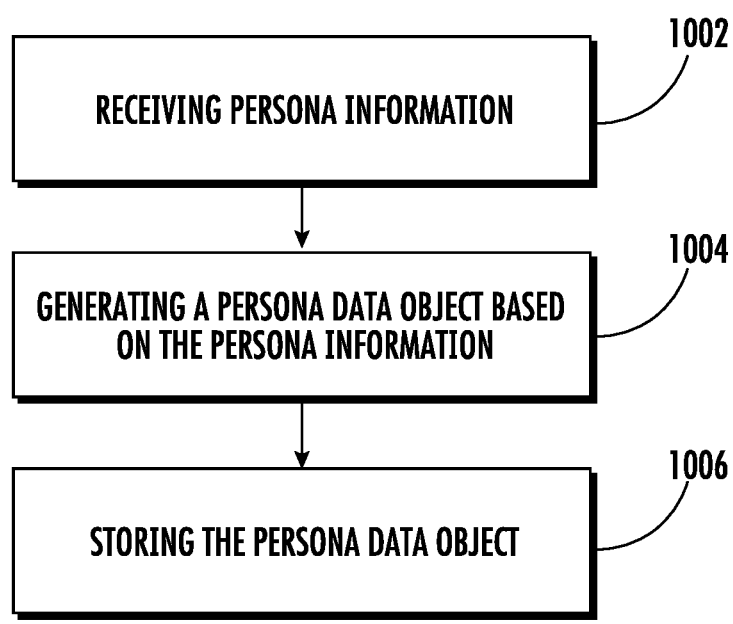
Figure 11:
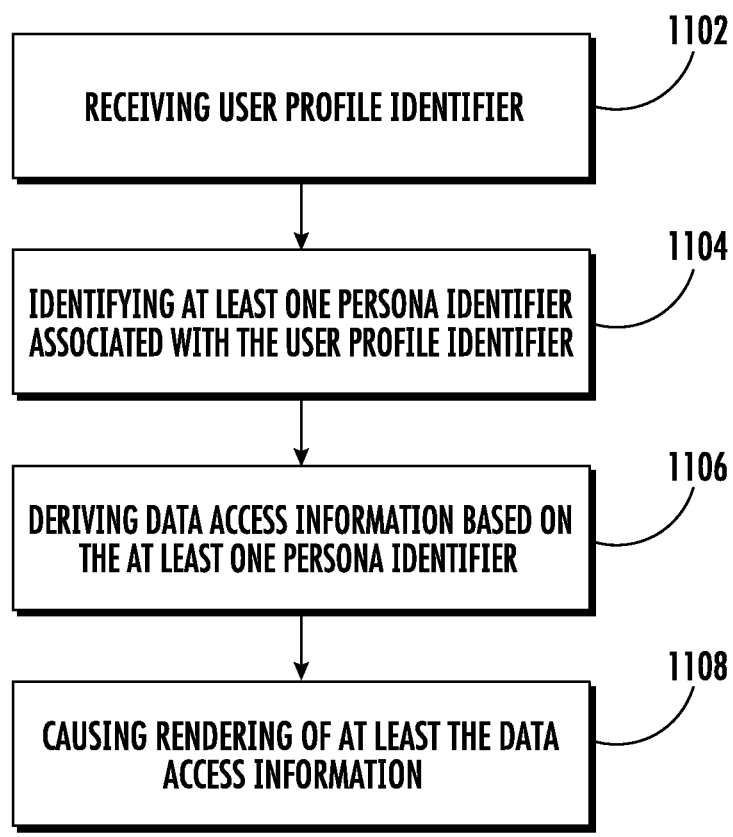

Having thus described certain example embodiments of the present disclosure in general terms, reference will now be made to the accompanying drawings, which are not necessarily drawn to scale, and wherein:

FIG. 1 illustrates an example computing system within which embodiments of the present disclosure may operate;

FIG. 2 illustrates a block diagram of circuitry used in association with a data rights tracking system, in accordance with some example embodiments;

FIG. 3 illustrates an example architecture for use in managing secured data according to embodiments of the present disclosure;

FIG. 4 illustrates exemplary operations for registering data access controls, in accordance with some example embodiments;

FIG. 5 illustrates exemplary operations for applying data asset authority logic to a dataset, in accordance with some example embodiments;

FIG. 6 illustrates exemplary operations for organizing a dataset into one or more volumes, in accordance with some example embodiments;

FIG. 7 illustrates exemplary operations for attaching one or more assets to one or more volumes, in accordance with some example embodiments;

FIG. 8 illustrates exemplary operations for registering dataset or volume permissions of use information regarding a dataset or volume, in accordance with some example embodiments;

FIG. 9 illustrates exemplary operations for enforcing attribute protection policies, in accordance with some example embodiments;

FIG. 10 illustrates exemplary operations for registering a persona data object, in accordance with some example embodiments;

FIG. 11 illustrates exemplary operations for providing an access control descriptive interface associated with a particular user profile, in accordance with some example embodiments;

FIG. 12 illustrates an example interface configured to receive a user input including a dataset indication, in accordance with some example embodiments;

FIG. 13 illustrates an example interface illustrating an example volume, in accordance with some example embodiments;

FIG. 14 illustrates an example interface configured to receive asset registration information used for attaching an asset to a volume, in accordance with some example embodiments;

FIG. 15 illustrates an example interface configured to receive a user input including dataset permissions of use information, in accordance with some example embodiments;

FIG. 16 illustrates an example search interface configured to provide search capabilities of dataset and volume permissions of use information to a computing device, in accordance with some example embodiments;

FIG. 17 illustrates an example persona details interface configured to provide persona information input elements for updating a persona data object and/or generating a new persona data object, in accordance with some example embodiments; and FIG. 18 illustrates an example access control descriptive interface configured to provide data access information, in accordance with some example embodiments.

DETAILED DESCRIPTION

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to electronic data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "programmatically expected" indicates machine prediction of occurrence of certain events. The term "likelihood" refers to a measure of probability for occurrence of a particular event. The term "machine learning model" refers to a machine learning task. Machine learning is a method used to devise complex models and algorithms that lend themselves to prediction. A machine learning model is a computer-implemented algorithm that can learn from data without relying on rules-based programming. These models enable reliable, repeatable decisions and results and uncovering of hidden insights through machine-based learning from historical relationships and trends in the data.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user" should be understood to refer to an individual, group of individuals, business, organization, and the like.

The term "user identifier" refers to one or more items of data by which a user may be identified. For example, a user identifier may comprise ASCII text, a pointer, a memory address, and the like.

The terms "user profile," "user account," and "user account details" refer to information associated with a user, including, for example, a user identifier, an email address, a real name (e.g., John Doe), a username (e.g., jdoe), a password, a real name, a time zone, a status, a position or role, an organizational or enterprise segment to which the user belongs, and the like. The user account details can include a subset designation of user credentials, such as, for example, login information for the user including the user's username and password.

The terms "dataset" and "data set" refer to a collection of data. A dataset can correspond to the contents of a single database table, or a single statistical data matrix, where every column of the table represents a particular variable, and each row corresponds to a given member of the data set in question. The data set can be comprised of tuples. A dataset is attached to an asset if the asset stores, processes, or transmits data in the dataset.

The term "volume" refers to a collection of one or more datasets and each dataset may belong to one or more volumes. Each volume may be attached to one or more assets and each asset may be attached to one or more volumes. A volume is attached to an asset if the asset stores, processes, or transmits data in the volume. Data attributes may be associated with a particular dataset or a particular volume. The term "data attributes" refers to one or more items of data representative of one or more classifications associated with secured data in an asset repository. Data attributes may be generated by a metadata source based on various sources of truth for attribute classifications. The sources of truth for attribute classifications may include: information provided by an information owner (transmitted via information owner device), legal restrictions, compliance restrictions, and/or the like. The data attributes may be generated using a machine learning model. In embodiments, written procedures and guidelines for data classification define what categories and criteria an organization or enterprise uses to classify data and specify the roles and responsibilities of employees or other entities within the organization or enterprise regarding data stewardship.

The term "data attribute identifier" refers to one or more items of data by which a data attribute may be identified. For example, a data attribute identifier may comprise ASCII text, a pointer, a memory address, and the like.

The term "access controls" refers to instructions that define a restriction on access to a dataset or a volume. For example, each data set or volume may be defined as only accessible to certain users. Examples of access controls include dataset permissions of use information and volume permissions of use information.

The term "secured data" refers to data that are secured and configured to be accessible to only a defined group of users, such as users granted with permissions of use to the secured data.

The term "dataset identifier" refers to one or more items of data by which a dataset may be identified. For example, a dataset identifier can comprise a data element representative of a dataset. A dataset identifier may include one or more data elements associated with the dataset, such as a name, an identifier, or the like associated with the dataset. For example, a dataset identifier may comprise ASCII text, a pointer, a memory address, and the like.

The term "permissions of use information" refers to data defining one or more conditions under which one or more users are granted access to a dataset or a volume, for example, having a user identifier equal to a pre-defined user identifier, or the like. A particular dataset or volume may be only accessible by the users granted access based on the permissions of use associated with the permissions of use information.

The term "dataset permissions of use information" refers to permissions of use information associated with a dataset. For example, dataset permissions of use information refers to data defining one or more conditions under which one or more users are granted access to a dataset. In embodiments, dataset permissions of use information is associated with a dataset permissions of use information identifier. A dataset permissions of use information identifier refers to one or more items of data by which dataset permissions of use information may be identified. For example, a dataset permissions of use information identifier may comprise ASCII text, a pointer, a memory address, and the like.

The term "volume permissions of use information" refers to permissions of use information associated with a volume. For example, volume permissions of use information refers to data defining one or more conditions under which one or more users are granted access to a volume. In embodiments, volume permissions of use information is associated with a volume permissions of use information identifier. A volume permissions of use information identifier refers to one or more items of data by which volume permissions of use information may be identified. For example, a volume permissions of use information identifier may comprise ASCII text, a pointer, a memory address, and the like.

The terms "register" or "registering" refer to the process of associating certain data or elements with other data. For example, dataset permissions of use information may be associated with or registered to a dataset.

The term "user identity" refers to one or more items of data associated with a user profile. The one or more items of data comprising a user identity may include: one or more identifiers associated with the user, one or more dataset identifiers representative of datasets to which the user is allowed access, one or more proper use identifiers associated with the user, or one or more other data elements, such as various information stored in a user profile associated with the user.

The term "persona data object" refers to electronically managed data, associated with a user identity, that embodies access control to particular volumes and/or corresponding datasets for defined allowed uses. In this regard, a persona data object may be linked to various data objects for facilitating such access. A persona data object includes or is otherwise associated with a "persona identifier" that is a text string, numeral, alphanumeric string, or other identifier that uniquely identifies a particular persona data object. In some embodiments, a persona identifier is configured to be associated with a user identity and/or user profile with where the associated user is to be linked to the persona data object. In this regard, a user identity and/or user profile have data access rights controlled based on an associated persona data object.

The term "persona information" refers to one or more identifiers for controlled access information associated with or included in a persona data object. Examples include restrictions associated with the persona, associated permissions of use information, allowed use identifier(s), allowed account type identifier(s), accessible volume identifier(s) and/or accessible dataset identifier(s), or any combination thereof.

The term "proper use" refers to a set of usage rules that defines one or more allowed uses for a dataset. Examples of proper use may include one or more of: provision, acquisition, extraction, discovery, analytics, or the like. In examples, a proper use may be associated with a dataset identifier and one or more proper use identifiers.

The term "proper use identifier" refers to one or more items of data by which a proper use may be identified. For example, a proper use identifier may comprise ASCII text, a pointer, a memory address, and the like.

The term "compliance" refers to enforcement of permissions of use and restrictions associated with datasets, as well as satisfactory enforcement of permissions of use and restrictions associated with datasets. For example, an organization or enterprise may be considered "compliant" if the organization or enterprise enforces all permissions of use and restrictions associated with datasets. As another example, the process of enforcing permissions of use and restrictions associated with datasets may be referred to as "compliance." It will be appreciated that "compliance" may be measured on a scale—for example an organization or enterprise may be 100% compliant, the organization or enterprise may be 50% compliant, the organization or enterprise may be some percentage less than 100% compliant, and the like.

The term "restrictions" refers to instructions that define control of access to a dataset set forth in a contract associated with the dataset or a law associated with the dataset. Examples of restrictions include contractual restrictions, customer committed restrictions and legal restrictions.

The term "contractual restrictions" refers to instructions that define control of access to one or more datasets based on a contract associated with the one or more datasets. For example, certain privacy of use contracts may include terms defining how certain private data need to protected.

The term "customer committed restrictions" refers to instructions that define control of access to one or more datasets representing commitments made to a customer associated with the one or more datasets. For example, certain commitments may include terms defining how data is to be used which may not reflect the detail as agreed in the contract.

The term "legal restrictions" refers to instructions that define control of access to one or more datasets based on a law associated with the one or more datasets. For example, laws such as Health Insurance Portability and Accountability Act may define restrictions related to datasets associated with identities of patients.

The term "usage rules" refers to instructions that define control of access to one or more datasets based on the intended use of the dataset. Example types of use include analytics, enrichments, consumption, provision, or the like. One or more types of use may be disallowed under the usage rules and one or more types of use may be allowed under the usage rules. The usage rules may also be associated with one or more user identifiers that are allowed to access the one or more datasets and one or more user identifiers that are not allowed to access the one or more datasets.

The term "business owner" refers to an entity responsible for providing or defining allowed usage rules and authorization to access one or more datasets held within an owned asset.

The term "business owner identifier" refers to one or more items of data by which a business owner may be identified. For example, a business owner identifier may comprise ASCII text, a pointer, a memory address, and the like.

The term "business owner device" refers to a computing device controlled by a business owner that may include, without limitation, smart phones, tablet computers, laptop computers, wearables, personal computers, enterprise computers, and the like.

The term "information technology (IT) owner" refers to an entity responsible for authorizing data access requests based on proper use.

The term "IT owner identifier" refers to one or more items of data by which an IT owner may be identified. For example, an IT owner identifier may comprise ASCII text, a pointer, a memory address, and the like.

The term "IT owner device" refers to a computing device controlled by an IT owner that may include, without limitation, smart phones, tablet computers, laptop computers, wearables, personal computers, enterprise computers, and the like.

The term "information owner" refers to an entity responsible for managing attributes associated with datasets, such as by providing information that can be used to generate data attributes.

The term "information owner identifier" refers to one or more items of data by which an information owner may be identified. For example, an information owner identifier may comprise ASCII text, a pointer, a memory address, and the like.

The term "information owner device" refers to a computing device controlled by an information owner that may include, without limitation, smart phones, tablet computers, laptop computers, wearables, personal computers, enterprise computers, and the like.

The term "data steward" refers to an entity responsible for authorizing data access requests and providing information regarding data access controls. In an example context, such data access controls includes permissions of use information. In some embodiments, a data steward accesses functionality via data steward device.

The term "data steward identifier" refers to one or more items of data by which a data steward may be identified. For example, a data steward identifier may comprise ASCII text, a pointer, a memory address, and the like.

The term "data steward device" refers to a computing device controlled by a data steward that may include, without limitation, smart phones, tablet computers, laptop computers, wearables, personal computers, enterprise computers, and the like.

The term "end user" refers to an entity that consumes datasets, such as by attempting to access and utilize datasets. An end user is associated with a user identifier.

The term "end user device" refers to a computing device controlled by an end user that may include, without limitation, smart phones, tablet computers, laptop computers, wearables, personal computers, enterprise computers, and the like.

The term "data governance" refers to the management of the availability, usability, integrity and security of data used in an enterprise or organization. A sound data governance program includes a governing body or council, a defined set of procedures and a plan to execute those procedures.

The term "data stewardship" refers to the management and oversight of an organization's data assets to help provide business users with high-quality data that is easily accessible in a consistent manner.

The term "data attribute protection policy" refers to one or more permissions of use associated with a data attribute. A data attribute protection policy may be universal to any data having associated therewith the data attribute that is associated with the data attribute protection policy.

The term "data asset authority logic" refers to computing logic associated with an asset that is configured to identify one or more conflicts between restrictions and permissions of use associated with data contained therein.

As used herein, the terms "asset," "information asset," "information technology asset," "IT asset," and "technological asset" refer to a hardware or software technological asset configured for acquisition, storage, manipulation or processing, management, movement, control, display, switching, interchange, transmission, or reception of data or information. For example, an asset may be a hardware database, a software database embodied in various computing devices, or the like. In some example embodiments, an asset may be a storage device, repository, computer, computer equipment, network equipment and systems, and the like.

The term "volume identifier" refers to one or more items of data by which a volume may be identified. For example, a volume identifier may comprise ASCII text, a pointer, a memory address, and the like. In embodiments, a volume identifier may be a data structure having a plurality of fields, each field comprising or associated with a data steward identifier, an IT owner identifier, a business owner identifier, and/or an information owner identifier associated with each of the volume.

The term "volume metadata" refers to one or more items of data associated with a volume identifier, the one or more items of data representative of, for example, dataset identifiers associated with the volume (i.e., datasets belonging to the volume).

The term "asset registration data structure" refers to one or more items of data contained within a data structure, the data structure for use in registering one or more datasets or volumes with an asset. The one or more items of data may comprise one or more volume identifiers, one or more dataset identifiers, one or more asset identifiers, one or more business owner identifiers associated with the one or more asset identifiers, one or more IT owner identifiers associated with the one or more asset identifiers, and the like. The asset registration data structure may be used to attach a dataset and/or volume to an asset or associated a dataset and/or volume with an asset. The asset registration data structure may further comprise a description of the asset(s) identified by the one or more asset identifiers, for example one or more classifications of one or more datasets stored or otherwise proceed by the asset.

The term "asset metadata" refers to one or more items of data associated with an asset identifier. For example, asset metadata may comprise one or more of the elements of the asset registration data structure described above. For example, asset metadata may comprise one or more dataset identifiers associated with the asset identifier. The asset metadata may comprise one or more volume identifiers associated with the asset identifier. The asset metadata may further comprise one or more additional asset identifiers representative of assets associated or somehow related to the asset identified by the asset identifier.

The term "allowed account types" refers to organizational or enterprise electronic account types that are allowed to access a dataset or a volume. For example, a request to access a dataset or a volume originating from an account having a particular type may or may not be granted depending on whether the particular account type matches an allowed account type. Example account types include a service account, an end user account, a system account, and the like.

The term "allowed account type identifier" refers to one or more items of data by which an allowed account type may be identified. For example, an allowed account type identifier may comprise ASCII text, a pointer, a memory address, and the like.

The term "allowed use justifications" refers to use justifications allowed for a dataset or volume. Examples of use justifications may include treatment, payment, operations and regulatory.

The term "allowed use justification identifier" refers to one or more items of data by which an allowed use justification may be identified. For example, an allowed use justification identifier may comprise ASCII text, a pointer, a memory address, and the like.

The term "allowed use" refers to types of uses allowed for a dataset or volume. Example types of allowed use include analytics, enrichments, consumption, provision, or the like. An allowed use may be associated with a use identifier, such that the use identifier represents a use that is allowed.

The term "use identifier" refers to one or more items of data by which a use may be identified. For example, a use identifier may comprise ASCII text, a pointer, a memory address, and the like.

The term "offshore usage instruction" refers to an electronic instruction associated with a dataset identifier and/or a volume identifier, the instruction representative of whether the dataset associated with the dataset identifier and/or the volume associated with the volume identifier may be accessed by a computing device associated with an Internet protocol (IP) address that is known to have originated from a geographic location outside a defined boundary of GPS coordinates. For example, a dataset and/or volume may reside or have been created on computing systems and/or repositories located within a particular country (e.g., the United States). An offshore usage instruction may indicate that a computing device having an IP address that originated from or is associated with a location outside of the United States may or may not access the dataset and/or volume associated with the offshore usage instruction The term "allowed environments" refers to those environments within which computing devices may be operating that are approved for the computing devices to be granted access to a particular dataset or volume. Allowed environments may have associated therewith one or more dataset identifiers and/or one or more volume identifiers. Examples of environments include a production environment and a non-production environment.

The term "environment identifier" refers to one or more items of data by which a computing environment may be identified. For example, an environment identifier may comprise ASCII text, a pointer, a memory address, and the like. An approved environment may be associated with an environment identifier.

The term "personal protection flag" refers to an indicator associated with a dataset identifier and/or a volume identifier. The indicator represents whether the dataset associated with the dataset identifier and/or the volume associated with the volume identifier includes Personal Identifiable Information or Protected Health Information under the definition of Health Insurance Portability and Accountability Act (HIPAA). The term "proprietary information flag" or "confidential information flag" refers to an indicator associated with a dataset identifier and/or a volume identifier. The indicator represents whether the dataset associated with the dataset identifier and/or the volume associated with the volume identifier includes confidential and/or proprietary information that is viewed as property of the holder and not made available, or otherwise accessible, to other users associated with the general public at any time.

The term "data protection system" refers to a computing system configured to enforce controlled access to secured data and track such access of secured data according to embodiments described herein.

Example System Architecture

FIG. 1 illustrates an example computing system 100 within which embodiments of the present disclosure may operate. The example computing system 100 comprises a data repository 102, a data rights tracking system 104, and a data protection system 106. The data rights tracking system 104, data repository 102 and data protection system 106 may communicate with each other via underlying network 108.

The data repository 102 is a collection of data repositories that stores secured data to be governed by the data rights tracking system 104 and data protection system 106. The data repository 102 may be embodied as one or multiple computing devices. The data repository 102 may include asset data repository 102A and metadata repository 102B. Asset data repository 102A is one or more assets embodied as one or more databases that store secured data to be governed by the data rights tracking system 104 and data protection system 106.

Metadata repository 102B is configured to store a set of data attributes associated with the secured data in the asset data repository 102A. The data attributes are classifications associated with the secured data in the asset repository 102A. The metadata repository 102B may receive the set of data attributes from a metadata source configured to generate the data attributes based on various source of truth for attribute classifications. The source of truth for attribute classifications may include: information owner provided information (transmitted via information owner device 304), legal restrictions, compliance restrictions, and/or the like. The data attributes may be generated using a machine learning model. In some embodiments, the metadata repository 102B may be periodically updated or updated on demand.

The data rights tracking system 104 is a system configured to register data access controls to the secured data independent of the asset that stores, processes, and transmits the secured data. Example data access controls includes dataset permissions of use information and volume permissions of use information.

The data protection system 106 is a system configured to assign protection policies to one or more assets storing the secured data, such as one or more assets utilized to embody the asset data repository 102A, based on data access controls registered by the data rights tracking system 104. The data protection system 106 serves as an enforcement point for the data access controls registered by the data rights tracking system 104 by applying the data access controls registered by the data rights tracking system 104 (i.e., the data access controls are independent of the assets) to the assets. The data protection system 106 may be configured to grant access to data stored in asset data repository 102A by one or more end user devices based on data access controls stored in the data rights tracking system 104.

Secured data stored in the example computing system 100 is organized in various datasets. Each dataset includes various cataloging characteristics for data access controls registered by the data rights tracking system 104. Datasets are organized into volumes. A volume is a collection of one or more datasets and each dataset may belong to one or more volumes. Each volume may be attached to one or more assets and each asset may be attached to one or more volumes. A volume is attached to an asset if the asset stores, processes or transmits data in the volume. Data attributes may be associated with a particular dataset and/or a particular volume.

Example Apparatus for Implementing Embodiments of the Present Disclosure

The data rights tracking system 104 may be embodied by one or more computing devices, such as apparatus 200 shown in FIG. 2. As illustrated in FIG. 2, the apparatus 200 may include a processor 202, a memory 204, input/output circuitry 212, communications circuitry 210, and circuitry to implement various modules such as data identity registration module 206, permissions of use registration module 208, proper use module 216, and data asset authority logic module 214. The apparatus 200 may be configured to execute the operations described herein. Although these components 202-216 are described in part using functional limitations, it should be understood that any implementations necessarily include the use of particular hardware. It should also be understood that certain of these components 202-216 may include similar or common hardware. For example, multiple modules or circuitries may leverage use of the same processor, network interface, storage medium, or the like, to perform their associated functions, such that duplicate hardware is not required for each distinct module or circuitry. The terms "circuitry" and "module" as used herein therefore includes particular hardware configured to perform the respective functions described herein.

Of course, while the term "circuitry" or "module" should be understood broadly to include hardware, in some embodiments it may also include software for configuring the hardware. In some embodiments, "circuitry" or "module" may include processing circuitry, storage media, network interfaces, input/output devices, and the like. In some embodiments, other elements of the apparatus 200 may provide or supplement the functionality of particular circuitries or modules. For example, the processor 202 may provide processing functionality, the memory 204 may provide storage functionality, the communications circuitry 210 may provide network interface functionality, and the like.

The processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 212 that may, in turn, be in communication with processor 202 to provide output to a user and, in some embodiments, to receive an indication of user input. The input/output circuitry 212 may comprise a user interface and may include a display and may comprise a web user interface, a mobile application, a client device, or the like. In some embodiments, the input/output circuitry 212 may also include a keyboard, a mouse, a touch screen, touch areas, soft keys, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 210 may be any means such as a device or circuitry embodied in either hardware or a combination of hardware and software that is configured to receive and/or transmit data from/to a network and/or any other device, circuitry, or module in communication with the apparatus. In this regard, the communications circuitry 210 may include, for example, a network interface for enabling communications with a wired or wireless communication network. For example, the communications circuitry 210 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The data identity registration module 206, the permissions of use registration module 208, the proper use module 216, and the data asset authority logic module 214 may be any means such as a device or circuitry embodied in either hardware or a combination of hardware and software that is configured to perform the corresponding functions of these components that are described herein. It should be appreciated that, in some embodiments, the data identity registration module 206, the permissions of use registration module 208, the proper use module 216, and/or the data asset authority logic module 214 may include a separate processor, specially configured field programmable gate array (FPGA), or application specific interface circuit (ASIC) to perform the corresponding functions described herein. Accordingly, in one fashion or another, the data identity registration module 206, the permissions of use registration module 208, the proper use module 216, and the data asset authority logic module 214 are therefore implemented using hardware components of the apparatus which may in turn be configured by either hardware or software.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product stored on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Exemplary Management of Secured Data

FIG. 3 illustrates an example architecture for use in managing secured data according to embodiments of the present disclosure. Business owners provide allowed usage rules and authorization to utilize secured data held within an asset managed by the business owners via a business owner device 302. A unique business owner identifier may be associated with each of the business owners.

Information owners provide attribute classification information and/or attest attribute classification generated by a machine learning model via information owner device 304. A unique information owner identifier may be assigned to each of the information owners. As previously described, the attribute classification information provided via information owner device 304 may be utilized to generate data attributes stored in the metadata repository 102B. Information owners may also provide machine learning model and/or feed training data to the machine learning model configured to generate data attributes. The data attributes may be stored in the data rights tracking system 104.

Data stewards, designated by business owners in some examples, may provide information regarding data access controls such as permissions of use information via data steward device 306. A unique data steward identifier may be associated with each of the data stewards. The information regarding data access controls provided via data steward device 306 may be processed by the data rights tracking system 104. The data rights tracking system 104 may generate and store data access controls based on the information regarding data access controls provided via data steward device 306.

End users may consume data, such as attempting to access data, via end user device 308. A unique end user identifier may be assigned to each of the end users. The data protection system 106 may be configured to grant access to data stored in asset data repository 102A to one or more end user devices 308 based on data access controls stored in the data rights tracking system 104. In some embodiments, various data representative of user identity, such as one or more identifiers associated with the user, one or more dataset identifiers associated with those datasets the user is allowed to access, one or more proper use identifiers associated with the user identifier, and the like, may be checked to verify that the end user device 308 is controlled by and/or associated with a user identifier associated with an end user allowed to access the datasets. In some such embodiments, each user identifier may be associated with one or more role identifiers, where each role identifier is associated with one or more proper use identifiers. Additionally or alternatively, each user identifier may be associated with one or more persona identifiers.

Compliance managers provide assurance of enforcement of data protection system 106 via compliance device 310. A unique compliance manager identifier may be assigned to each of the compliance managers. Compliance device 310 may be configured to communicate with the data protection system 106.

Each of the business owner device 302, information owner device 304, data steward device 306, end user device 308, and compliance device 310 may be embodied as various computing devices such as a computer, a server, a mobile device, and/or the like.

Example Operations Performed by the Data Rights Tracking System

FIG. 4 illustrates exemplary operations for registering access controls to secured data independent of the asset that stores, processes, and transmits the secured data, in accordance with some example embodiments. As noted previously, these operations may be performed by the data rights tracking system 104 with the assistance of, and/or under the control of a computing device such as apparatus 200.

At operation 402, apparatus 200 includes means, such as communications circuitry 210, input/output circuitry 212, or the like, for receiving an dataset identifier. As previously described, secured data stored in the example computing system 100 is organized into various datasets. Datasets are organized into volumes. A volume is a collection of one or more datasets and each dataset may belong to one or more volumes. Each volume may be attached to one or more assets and each asset may be attached to one or more volumes. A volume is defined as attached to an asset if the asset stores, processes or transmits data in the volume. Data attributes may be associated with a particular dataset or a particular volume.

A dataset identifier may include one or more of 1) a unique identifier associated with the dataset, 2) a dataset publication status, 3) a data steward identifier associated with a data steward associated with the dataset, 4) a name associated with the dataset, 5) one or more volume identifiers associated with the dataset, and/or the like. In some embodiments, the dataset identifier may be received from a data steward device 306. Alternatively or additionally, the dataset identifier may be received from an information owner device 304.

An example interface 1200 configured to receive a user input including a dataset identifier is illustrated in FIG. 12. As illustrated in FIG. 12, the interface 1200 includes input fields configured to receive user inputs representing a dataset name, a dataset description, a dataset publish date, identifiers related to dataset ingestion roles such as business owner identifier and information owner identifier, identifiers related to dataset consumption roles such as IT (Information Technology) owner and data steward. In some embodiments, an IT owner is responsible for applying/enforcing a set of defined controls upholding usage rules and data access controls. The interface 1200 further includes input fields configured to receive one or more volume identifiers associated with the dataset including volume title, volume description, and volume attached assets.

At operation 404, apparatus 200 includes means, such as data identity registration module 206 executed using processing circuitry, or the like, for organizing a dataset associated with the dataset identifier into one or more volumes. Each of the one or more volumes is associated with a unique volume identifier. In this regard, the apparatus 200 may receive data embodying updated values for various volume details, for example in response to user engagement data received in response to a save button or other user interface element configured to initiate submission of inputted data. Additionally or alternatively, the apparatus 200 may store such received volume details, for example in response to the user engagement data. Additionally or alternatively still, in some embodiments, the apparatus 200 may update the volume based on user engagement data received in response to user interaction by a user with the interface, for example to publish the volume and/or attached datasets.

FIG. 13 illustrates an example interface 1300 configured to display various volume details, according to embodiments of the present disclosure. As illustrated in the example interface 1300, the volume details include a volume name, a volume description, a volume publish date, a volume IT Owner identifier, a volume Data Steward identifier, a volume Business Owner identifier, a volume Information Owner identifier, one or more asset identifiers associated with the volume, asset name(s) and other related information, and dataset identifiers and associated metadata associated with one or more datasets that belong to the volume. The metadata associated with the one or more datasets include dataset publication dates, data steward identifiers associated with each of the one or more datasets, an accessible records count associated with each of the one or more datasets, a dataset restrictions count identifying the number of restrictions applied for each of the one or more datasets, protection classifications associated with each of the one or more datasets, and/or other metadata associated with the one or more datasets. The interface 1300 may further be configured for enabling access to volume details submission and/or storing functionality, for example via the "save as draft" or a similar interface element configured to initiate such functionality, for example in response to user interaction upon changing aspects of the volume details. Additionally or alternatively, the interface 1300 may further be configured for enabling volume publishing data, for example via the "publish" or a similar interface element configured to initiate such functionality, for example in response to user interaction indicating a desire to change the publication status of the volume and/or associated datasets. Additionally or alternatively, the interface 1300 may further be configured for enabling dataset attachment functionality, for example via the "attach dataset" or a similar interface element configured to initiate such functionality, for example in response to user interaction with such element.

At operation 406, apparatus 200 includes means, such as data identity registration module 206 executed by processing circuitry, or the like, for attaching one or more assets to the one or more volumes. In embodiments, one or more assets are attached to the one or more volumes by associating one or volume identifiers associated with the one or more volumes with one or more asset identifiers associated with the one or more assets.

FIG. 14 illustrates an exemplary interface 1400 configured to receive asset registration information used for attaching an asset to a volume. In some embodiments, the apparatus 200 causes the interface 1400 to be rendered in response to user interaction indicating and/or associated with a request to attach an asset to a volume. In this regard, for example, the user may interact with one or more interface elements of the interface 1300 described above, such as an "attach dataset" interface element or another interface element configured to initiate such functionality.

At operation 408, apparatus 200 includes means, such as communications circuitry 210, input/output circuitry 212, or the like, for receiving dataset permissions of use information associated with the dataset. In some embodiments, the dataset permissions of use information associated with the dataset is received from a data steward device 306 or an information owner device 304.

FIG. 15 illustrates an exemplary interface 1500 configured to receive a user input including the dataset permissions of use information. As illustrated in FIG. 15, the interface 1500 includes input fields configured to receive user inputs providing various permissions of use details such as allowed account types, allowed environments, allowed use, allowed use justifications, offshore usage instructions (e.g., offshore allowed), personal protection flag (e.g., protection consumption profile), and one or more record authorization mechanisms.

At operation 410, apparatus 200 includes means, such as permissions of use registration module 208 executed by processing circuitry, or the like, for registering dataset permissions of use information with the dataset. Dataset permissions of use information are registered with the dataset by associating a dataset permissions of use information identifier associated with the dataset permissions of use information with the dataset identifier.

At operation 412, apparatus 200 includes means, such as permissions of use registration module 208 executed by processing circuitry, or the like, for registering volume permissions of use information with the one or more volumes. In some embodiments, volume permissions of use information are registered with the one or more volumes by associating a volume permissions of use information identifier associated with the volume permissions of use information with the one or more volume identifiers. In this regard, access to a volume (having a particular volume identifier) will be limited based on the volume permissions of use information (having a particular volume permissions of use information identifier) where the such identifiers are associated.

FIG. 5 illustrates exemplary operations for applying a set of data asset authority logic in accordance with example embodiments. At operation 502, the data asset authority logic module 214, executed by processing circuitry, receives a set of restrictions associated with the dataset. The set of restrictions may be derived based on various obligations associated with controlled access to the dataset, such as contractual restrictions, legal restrictions, customer committed restrictions, or the like. The set of restrictions may be generated and transmitted from compliance device 310 or information owner device 304. Example restrictions include limitations and/or prevention on accessing data for offshoring, data aggregation, de-identification, and/or research, or any combination thereof.

Offshoring, as mentioned above, refers to access to a dataset that resides in a particular geographic location by computing devices associated with IP addresses originating from outside a particular geographic boundary. For example, offshoring may refer to the use, disclosure, storage, receipt, processing, transferring, handling or accessing of protected health information (PHI) in the dataset to or by a computing entity located outside the fifty United States and/or United States territories (American Samoa, Guam, Northern Marianas, Puerto Rico, and Virgin Islands). Examples of countries that might be considered "offshore" with respect to the United States include, without limitation, Mexico, India, the Philippines and Canada.

Data aggregation refers to combining one or more distinct data record(s), datasets, and/or subsets of one or more dataset(s), where the combined portions of data are associated with separate entities. In a particular example context, data aggregation refers to combining PHI in the dataset from two or more Health Insurance Portability and Accountability Act (HIPAA) covered entities for data analysis regarding their health care operations (such as for quality improvement or evaluation of performance).

De-identification refers to the identification and/or data alteration of one or more data categories within one or more data record(s) of one or more data set(s) such that such altered data categories do not identify particular entities associated with the data record. In one example context, de-identification refers to taking PHI in the dataset and converting it (by removing certain "identifiers") so that the health information (1) no longer identifies any particular individual; and (2) cannot reasonably be used to identify any particular individual.

Research refers to a systematic investigation, including research development, testing, and evaluation, designed to develop or contribute to generalizable knowledge that utilizes one or more data records of a dataset, and/or particular data categories within one or more data record(s). In one example context, research refers to a systematic investigation including research development, testing, and evaluation, designed to develop or contribute to generalizable knowledge that utilizes PHI in the dataset.

At operation 504, the data asset authority logic module 214, executed by processing circuitry, identifies, by comparing the set of restrictions to dataset permissions of use information, that the set of restrictions does not conflict with the dataset permissions of use information previously registered. In this regard, rule sets for comparing one or more restrictions to the dataset permissions of use information may be embodied and/or stored as software, hardware, or a combination thereof. After the data asset authority logic module 214 identifies that the set of restrictions does not conflict with the dataset permissions of use information, the data asset authority logic module 214 may validate, at operation 506, the set of restrictions and generate and store an indication of the validation. If the data asset authority logic module 214 identifies that the set of restrictions conflicts with the dataset permissions of use information previously registered, the data asset authority logic module 214 may generate and store an indication that the set of restrictions is not validated. In some embodiments, timestamp data associated with receiving the set of restrictions, validating or not validating the set of restrictions may be recorded and stored. It will be appreciated that, prior to comparing the set of restrictions to the dataset permissions of use information, the data asset authority logic module may retrieve the dataset permissions of use information associated with the dataset from a repository. It will be appreciated that the indication that a set of restrictions is valid is an item of data representative of a confirmation that the set of restrictions does not conflict with dataset permissions of use information for a particular dataset.

FIG. 6 illustrates exemplary operations performed by apparatus 200, such as data identity registration module 206 of apparatus 200 executed by processing circuitry, for organizing the dataset into one or more volumes in accordance with example embodiments. At operation 602, the data identity registration module 206 receives a volume identifier associated with one or more volumes The volume identifier may be in the form of a volume identifier data structure having a plurality of fields, each field comprising or associated with one or more of a unique volume identifier, a data steward identifier, an IT owner identifier, a business owner identifier, and/or an information owner identifier associated with each of the volumes. The volume identifier data structure may include one or more unique identifiers associated with the one or more volumes and/or one or more descriptions associated with the one or more volumes. In some embodiments, the volume identifier data structure is received from a data steward device 306 or an information owner device 304. In some embodiments, the volume identifier data structure is received via user interaction with the interface 1200 illustrated in FIG. 12.

At operation 604, the data identity registration module 206 generates volume metadata comprising one or more items of data representative of, for example, dataset identifiers associated with the volume. In this regard, each dataset identifier may be associated with a dataset belonging to at least one of the indicated volumes. At operation 606, the data identity registration module 206 stores the volume metadata. In some embodiments, the volume metadata is stored by updating existing volume metadata associated with each of the one or more volumes. The updates to the existing volume metadata to reflect that the dataset belongs to the one or more volumes and all of the data stored in the volume metadata may be stored in the volume metadata.

In some embodiments, timestamp data associated with creation of dataset, modification of dataset, creation of volume, modification of volume, and/or other actions taken toward volume and/or dataset may be recorded and stored as part of, or associated with, the corresponding volume metadata. Such timestamp data may be retrieved in association with various provided sorting, searching, data processing, and/or auditing functionality, or the like.

In some embodiments, the volume metadata further includes one or more dataset status indications representative of one or more statuses of the one or more datasets (e.g., whether the dataset is published or not), a description associated with the volume, and other information associated with the volume.

FIG. 7 illustrates exemplary operations performed by apparatus 200, such as data identity registration module 206 executed by processing circuitry, for attaching one or more assets to the one or more volumes in accordance with some example embodiments. At operation 702, the data identity registration module 206 receives an asset registration data structure associated with one or more assets. The asset registration data structure may comprise one or more volume identifiers, one or more asset identifiers, one or more business owner identifiers associated with the one or more asset identifiers, one or more IT owner identifiers associated with the one or more asset identifiers, and/or the like. The asset registration data structure may further include data representative of what type of data the asset stores or processes. An example interface 1400 configured to receive asset registration data structures used for attaching an asset to a volume is illustrated in FIG. 14.

In some embodiments, at operation 704, the one or more assets may store, under the permission of the data identity registration module 206, the one or more datasets of each of the one or more volumes based on the asset registration data structure. In some such embodiments, the asset integrates with a data protection system, for example the data protection system 106, for authorization. In this regard, in some such embodiments, the data protection system 106 functions as the enforcement point with regard to such authorization. The data protection system 106 may be configured to retrieve and/or otherwise receive data attribute protection policies and/or individual data permissions of use information for use in determining whether to provide authorization. In some such embodiments, the data protection system 106 is configured to communicate with a data rights tracking system, such as a data rights tracking system 104, for retrieving such information allocated to the one or more assets.

At operation 706, the data identity registration module 206 may generate asset metadata. The asset metadata comprises one or more items of data associated with an asset identifier. For example, asset metadata may comprise one or more of the elements of the asset registration data structure described above. For example, asset metadata may comprise one or more dataset identifiers associated with the asset identifier. The asset metadata may comprise one or more volume identifiers associated with the asset identifier. The asset metadata may further comprise one or more additional asset identifiers representative of assets associated or somehow related to the asset identified by the asset identifier.

At 708, the data identity registration module 206 may store the asset metadata. In some embodiments, the asset metadata is stored by updating existing volume metadata associated with each of the one or more volumes. In some embodiments, timestamp data associated with attaching each of the one or more assets to each of the one or more volumes may be recorded and stored in the asset metadata. Such timestamp data may be retrieved in association with various provided sorting, searching, data processing, and/or auditing functionality, or the like.

FIG. 8 illustrates exemplary operations performed by apparatus 200, such as permissions of use registration module 208 executed by processing circuitry, for registering dataset or volume permissions of use information associated with a dataset or volume in accordance with some example embodiments. At operation 802, the permissions of use registration module 208 receives dataset and/or volume permissions of use information. In some embodiments, dataset or volume permissions of use information may be received from a data steward device 306.

In some embodiments, dataset permissions of use information may include allowed account types, allowed environments, allowed use, allowed use justifications, indication of offshore allowed, protection consumption profile, and record authorization for a given dataset identifier. In some embodiments, volume permissions of use information may include allowed account types, allowed environments, allowed use, allowed use justifications, indication of offshore allowed, protection consumption profile, and record authorization for a given volume identifier. Examples of use justifications may include treatment, payment, operations and regulatory. Example types of accounts include a service account, an end user account, a system account, or the like. Example types of allowed use include analytics, enrichments, consumption, provision, or the like. In some embodiments, the volume permissions of use information and dataset permissions of use information may further include an indication of required training to gain access, such as a unique identifier or a link associated with the training. In some embodiments, dataset permissions of use information and volume permissions of use information may further include unique identifiers of permitted or restricted end users.

FIG. 15 illustrates an exemplary interface 1500 configured to receive a user input including dataset permissions of use information. The interface 1500 may be presented and/or otherwise rendered at a data steward device 306, for example to a display associated with the data steward device 306 via a network portal. As illustrated in FIG. 15, the interface 1500 includes input fields configured to receive user inputs for various permissions of use details such as allowed account types, allowed environments, allowed use, allowed use justifications, indication of offshore allowed, protection consumption profile, and record authorization.

At operation 804, the permissions of use registration module 208 generates dataset or volume permissions of use metadata based on the dataset or volume permissions of use information. All data included in the dataset or volume permissions of use information may be included in the dataset or volume permissions of use metadata. At operation 806, the permissions of use registration module 208 stores the dataset/volume permissions of use metadata. The dataset/volume permissions of use metadata may be stored by updating existing volume detail information associated with each of the one or more volumes. Dataset permissions of use metadata may be stored as associated with the particular dataset within the volume.

FIG. 9 illustrates exemplary operations performed by apparatus 200 for enforcing attribute protection policies in accordance with some example embodiments. At operation 902, the apparatus 200 includes means, such as communications circuitry 210, input/output circuitry 212, or the like, for receiving one or more data attributes associated with the dataset from the metadata repository 102B. The data attributes are attribute classifications associated with the dataset. Example attributes may be associated with PHI and/or specific sensitive data to be accessible based on policies and/or permissions. In one such example context, example attributes indicate: whether the dataset include social security numbers, whether the dataset include health insurance claim numbers, whether the dataset include biometric identifiers, whether the dataset include genomic data, whether the dataset include names, or whether the dataset include Medicare beneficiary identifiers.

At operation 904, the apparatus 200 includes means, such as communications circuitry 210, input/output circuitry 212, or the like, for receiving one or more data attribute protection policies associated with the one or more data attributes. The one or more data attribute protection policies may be received from a defined source of truth. For example, in some embodiments, one or more end user devices may be utilized to provide such policies. In other embodiments, the defined source of truth may include data retrieved from one or more predefined and/or dynamically determined datastores upon configuration of the apparatus 200. At operation 906, the apparatus 200 includes means, such as communications circuitry 210, input/output circuitry 212, or the like, for enforcing the one or more data attribute protection policies associated with the one or more data attributes by transmitting the one or more data attribute protection policies to the data protection system 106. The data protection system 106 is configured to enforce the one or more data attribute protection policies on the one or more assets. Therefore, the attribute protection policies serves a layer of protection of the dataset that targets the assets.

In some embodiments, the data attribute protection policies are retrievable for enforcement via one or more API communications with one or more associated systems, devices, datastores, and/or the like. In this regard, the apparatus 200 may provide an endpoint for such API requests. The API endpoint may provide such data attribute protection policies through processing a specially configured query received that includes an asset identifier, and optionally a volume identifier and/or a publish date. For example, in some example embodiments, the endpoint is configured for processing API request queries configured in the format of:
GET/attributeprotections/
{assetId}?volumeId={volumeId}&publishDate=
{publishDate}

In response to such a query, response data may be received. The response data may include structured and/or unstructured data embodying identified attribution protection policies. For example, in some embodiments, the response data includes the attribution protection policies represented using extensible markup language (XML), or a similar schema-based data representation.

Similarly, in some embodiments, the apparatus 200 may similarly function as an endpoint for proper use identifier(s) one or more user identifiers and/or corresponding role identifiers for an end user identifier. In this regard, the apparatus 200 may provide an endpoint for such API requests. The API endpoint may provide such proper use identifiers through processing another specially configured query received that includes a role identifier (e.g., a particular persona identifier). For example, in some example embodiments, the endpoint is configured for processing proper use API request queries configured in the format of:
GET/properuses/{roleIdentifier}

In response to such a proper use query, response data may be similarly received. The response data may include structured and/or unstructured data embodying identified proper use identifiers and/or associated proper use data. For example, in some embodiments, the response data includes the proper use information represented using XML, or a similar schema-based data representation.

Similarly, in some embodiments, the apparatus 200 may similarly function as an endpoint for various access restriction and/or boundary data associated with data access, for example as usage rules associated with one or more various and/or corresponding dataset(s). In this regard, the apparatus 200 may provide an endpoint for such API requests. The API endpoint may provide such usage rule-related data through processing another specially configured query received that may include and/or be associated with one or more role identifiers. For example, in some example embodiments, the endpoint is configured for processing intended use API request queries configured in the format of:
GET/intendeduses In response to such an intended use query, response data may be similarly received. The response data may include structured and/or unstructured data embodying usage rule-related data. For example, in some embodiments, the response data includes the usage rule-related data represented using XML, or a similar schema-based data representation.

Similarly, in some embodiments, the apparatus 200 may similarly function as an endpoint for various authorized use data associated with a particular asset identifier. In this regard, the apparatus 200 may provide an endpoint for such API requests. The API endpoint may provide such authorized use data through processing another specially configured query received that may include and/or be associated with an asset identifier. For example, in some example embodiments, the endpoint is configured for processing authorized use API request queries configured in the format of:

GET/authorizeduse/{assetId}

In response to such an authorized use query, response data may be similarly received. The response data may include structured and/or unstructured data embodying authorized use data. For example, in some embodiments, the response data includes the authorized use data represented using XML, or a similar schema-based data representation.

In some embodiments, the proper use module 216 may present one or more search interfaces configured to provide search capabilities of dataset and volume permissions of use information to an end user device 308. An example search interface 1600 is provided in FIG. 16. As illustrated in FIG. 16, the example search interface 1600 includes various search criteria including volume, dataset, asset, environment type, use justification, or the like. Permissions of use information and various metadata associated with the volumes and datasets are presented.

FIG. 10 illustrates exemplary operations performed by apparatus 200, such as permissions of use registration module 208, data identity registration module 206, proper use module 216, and data asset authority logic module 214, or any combination thereof, executed by processing circuitry, for registering a persona data object. A registered persona data object may be linked to one or more user identity and/or user profile(s) to configure access control based on persona information for the linked data object. In this regard, for example, a user identifier may be associated with a persona identifier to link the user profile and/or user identity to the persona data object. At operation 1002, the modules receive persona information. In some embodiments, the persona information may be received from a data steward device 306.

In some embodiments, persona information includes one or more data objects and/or identifiers associated with controlled access to stored data for allowed uses. In this regard, in some embodiments, the persona information includes restrictions to be imposed on the user with which the persona data object is assigned, or otherwise linked (e.g., and to be used when determining if such a user may access certain requested data by comparing the restrictions with permissions of use information upon request by a user). Additionally or alternatively, the persona information may include permissions of use information. Additionally or alternatively, in some embodiments, the persona information includes allowed use identifier(s). Additionally or alternatively, in some embodiments, the persona information includes allowed account type identifier(s). Additionally or alternatively, in some embodiments, the persona information includes accessible volume identifier(s) and/or accessible dataset identifier(s).

FIG. 17 illustrates an exemplary interface 1700 configured to receive a user input including persona information. Further, the interface 1700 may be configured for submission of the persona information, for example for draft storing, and/or publishing, for example for generation of a corresponding persona data object. The interface 1700 may be presented and/or otherwise rendered at a data steward device 306, for example to a display associated with the data steward device 306 via a network portal. As illustrated in FIG. 17, the interface 1700 includes input fields configured to receive user inputs for various allowed uses, allowed user identity/identities, and accessible data. It should be appreciated that these inputs may be provided via any number of interface elements having various known interface element types (e.g., picker views, checkboxes, multi-select tools, and/or the like).

At operation 1004, the modules generate a persona data object based on the persona information. In this regard, the persona data object may include the persona information and/or associated identifiers linked to the data objects for access control. Additionally or alternatively, the modules may generate metadata associated with the persona information and include the metadata in the persona data object. At operation 1006, the modules store the persona data object. The persona data object may be stored such that it is retrievable using the corresponding persona identifier. In this regard, the stored persona data object may be assignable (or otherwise linked) to one or more user identity and/or user profile(s). When a particular end user attempts to access data through a corresponding user profile that is linked to a particular generated persona identifier, for example, access control may be processed and provided based on the persona data object corresponding to the linked persona identifier.

FIG. 11 illustrates exemplary operations performed by apparatus 200, such as permissions of use registration module 208, data identity registration module 206, proper use module 216, and data asset authority logic module 214, or any combination thereof, executed by processing circuitry, for providing an access control descriptive interface associated with a particular user profile. In this regard, the access control descriptive interface may provide various information associated with allowable access to a user associated with a particular user profile and/or user identity/identities. For example, the interface may be displayed to the user via a display associated with an end user device, and the interface may include summary data associated with the user profile (e.g., biographical information, identifier information, user identity information, and/or the like) and/or allowed control. The allowed control may be based on one or more personas linked to the user profile and/or user identities, such that information for accessed control may be derived therefrom.

At operation 1102, the modules receive a user profile identifier. The user profile identifier may be received in response to one or more transmission from an end user device. For example, an end user may begin an authenticated session by authenticating with the apparatus 200, and/or an associated system, to begin accessing functionality described herein. In some such embodiments, the user, via the end user device, may access a particular interface element indicating a request to have access control information displayed, and transmit a corresponding request to the apparatus 200. In some such embodiments, the user profile identifier may be parsed from the request. In other embodiments, the user profile identifier is input by the user.

At operation 1104, the modules identify at least one persona identifier associated with the user profile identifier. In some embodiments, the persona identifiers are identified by querying one or more datastores storing data embodying links between persona identifier(s) and user profile identifier(s). In this regard, the retrieved persona identifiers may have been associated with (e.g., linked to) the user profile by a data steward and/or other administrative user.

At operation 1106, the modules derive data access information based on the at least one persona identifier. In some embodiments, each associated persona identifier corresponds to a persona data object. The persona data object may include persona information embodying various data access information, for example permissions of use information and/or accessible volume identifiers. Additionally or alternatively, portions of persona information may be processed to derive other data access information based on one or more business rules. For example, such derived information may include accessible datasets based on accessible volume identifiers, or the like based on the persona information for each persona data object associated with an identified persona identifier At operation 1108, the modules cause rendering of at least the data access information. In some embodiments, the data access information is rendered additionally with user profile information and/or other summary information associated with a user profile. The data access information may be rendered to an access control descriptive interface (e.g., a "My Data Rights" interface) that includes interface elements including data access information viewable by a user. Additionally or alternatively, interface elements may be included for filtering rendered data, sorting rendered data, searching rendered data, and/or otherwise adjusting the interface based on specific information desired by the user. The interface may be rendered to a display associated with an end user device, for example associated with a transmission for receiving the user profile identifier at an earlier operation. In this regard, the modules may cause rendering by generating, configuring, and/or transmitting a response transmission including at least the data access information. In this regard, the "My Data Rights" interface provides, for a user associated with a particular user account, information regarding the potential data access available to the user based on the defined permissions and rules. In one example context, where no permissions of use or other data rights have been granted, a user may be presented with an empty selection grid (e.g., a blank selection grid).

FIG. 18 illustrates an exemplary interface 1800 configured to include such data access information. As illustrated, the interface 1800 further includes user profile information. The interface 1800 includes persona information (e.g., persona identifiers) identified associated with the user profile. Additionally or alternatively, the interface 1800 includes allowed use data and allowed use justifications data associated with, included in, or derived from linked persona data objects. Additionally or alternatively, the interface 1800 includes protection consumption profile data, identifiers, and/or the like associated with, included in, or otherwise derived from the linked persona data objects. Further, in some embodiments, the interface 1800 includes attached dataset information. In some embodiments, one or more of the rendered data is based on or included in retrieved proper use information retrieved based on linked persona identifiers.

Additionally or alternatively, interface 1800 includes one or more interface elements associated with requesting data access. In some such embodiments, a data access playbook interface element may be provided. The data access playbook interface element may provide the end user with steps to be performed, for example via the system, for requesting such permissible access. Further, it should be appreciated that such step data may be identified based on the linked persona identifiers.

CONCLUSION

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for controlling and tracking access to secured data, the method comprising:
   receiving, using processing circuitry and originating from a remote computing device, a dataset identifier;
   organizing, using the processing circuitry, a dataset represented by the dataset identifier into one or more volumes, each of the one or more volumes associated with a unique volume identifier;
   attaching, using the processing circuitry, one or more assets to the one or more volumes by associating one or more asset identifiers with the one or more volume identifiers, wherein each asset is configured to store at least one of the one or more volumes;
   receiving, using the processing circuitry and originating from a data steward device, dataset permissions of use information associated with the dataset identifier, wherein the dataset permissions of use information comprises one or more of allowed use, allowed use justifications, indication of offshore allowed, or protection consumption profile;
   registering, using the processing circuitry and in a repository, the dataset permissions of use information with the dataset by associating a dataset permissions of use information identifier associated with the dataset permissions of use information with the dataset identifier;

registering, using the processing circuitry and in the repository, volume permissions of use information with the one or more volumes by associating a volume permissions of use information identifier associated with the volume permissions of use information with the one or more volume identifiers, wherein registering volume permissions of use information regarding the one or more volumes to the one or more volumes further comprises:

receiving, using the processing circuitry, volume permissions of use information originating from the data steward device, wherein a data steward associated with the data steward device is designated by an owner of the dataset;

generating, using the processing circuitry, volume permissions of use metadata based on the volume permissions of use information; and storing, using the processing circuitry and in the repository, the volume permissions of use metadata;

receiving, using the processing circuitry and originating from the remote computing device, a set of restrictions associated with the dataset identifier;

retrieving, using the processing circuitry and from the repository, dataset permissions of use information associated with the dataset identifier;

determining, using the processing circuitry, by comparing the set of restrictions with the dataset permissions of use information, that the set of restrictions does not conflict with the dataset permissions of use information; and generating and storing an indication that the set of restrictions is validated.

2. The method of claim 1, wherein the set of restrictions comprises one or more of a set of contractual restrictions, a set of customer committed restrictions and a set of legal restrictions.

3. The method of claim 1, wherein organizing the dataset into the one or more volumes comprises:

receiving, using the processing circuitry, a volume identifier data structure associated with one or more volumes;

generating, using the processing circuitry, volume metadata comprising one or more dataset identifiers, indicating that datasets associated with the one or more dataset identifiers belong to the one or more volumes; and storing, using the processing circuitry and in the repository, the volume metadata.

4. The method of claim 1, wherein attaching the one or more assets to the one or more volumes comprises:

receiving, using the processing circuitry, an asset registration data structure associated with one or more assets;

storing, using the processing circuitry and in the repository, one or more datasets associated with each of the one or more volumes in the one or more assets based on the asset registration data structure;

generating, using the processing circuitry, asset metadata indicating that the one or more datasets of each of the one or more volumes is stored in the one or more assets; and storing, using the processing circuitry and in the repository, the asset metadata.

5. The method of claim 1, wherein registering the dataset permissions of use information regarding the dataset comprises:

receiving, using the processing circuitry, dataset permissions of use information originating from the data steward device;

generating, using the processing circuitry, dataset permissions of use metadata based on the dataset permissions of use information; and storing, using the processing circuitry and in the repository, the dataset permissions of use metadata.

6. The method of claim 1, wherein the volume permissions of use information comprises one or more of: allowed account types, allowed environments, allowed use, allowed use justifications, indication of offshore allowed, or protection consumption profile.

7. The method of claim 1, wherein the dataset permissions of use information defines one or more conditions under which one or more users are granted access to the dataset.

8. The method of claim 1, further comprising:

receiving, using the processing circuitry, one or more data attributes associated with the dataset from a metadata repository;

receiving, using the processing circuitry, one or more data attribute protection policies associated with the one or more data attributes; and enforcing, using the processing circuitry, the one or more data attribute protection policies associated with the one or more data attributes by transmitting the one or more data attribute protection policies to a data protection system, wherein the data protection system is configured to enforce the one or more data attribute protection policies on the one or more assets.

9. An apparatus comprising at least one processor, at least one memory storing computer program code, and at least one user interface, the at least one memory and the computer program code configured to, with the at least one processor, configure the apparatus to at least:

receive, originating from a remote computing device, a dataset identifier;

organize a dataset represented by the dataset identifier into one or more volumes, each of the one or more volumes associated with a unique volume identifier;

attach one or more assets to the one or more volumes by associating one or more asset identifiers with the one or more volume identifiers, wherein each asset is configured to store at least one of the one or more volumes;

receive, originating from a data steward device, dataset permissions of use information associated with the dataset identifier, wherein the dataset permissions of use information comprises one or more of allowed use, allowed use justifications, indication of offshore allowed, or protection consumption profile;

register, in a repository, the dataset permissions of use information with the dataset by associating a dataset permissions of use information identifier associated with the dataset permissions of use information with the dataset identifier;

register, in the repository, volume permissions of use information with the one or more volumes by associating a volume permissions of use information identifier associated with the volume permissions of use information with the one or more volume identifiers, wherein to register the volume permissions of use information regarding the one or more volumes to the one or more volumes, the apparatus is configured to:

receive volume permissions of use information originating from the data steward device, wherein a data steward associated with the data steward device is designated by an owner of the dataset;

generate volume permissions of use metadata based on the volume permissions of use information; and store, in the repository, the volume permissions of use metadata;

receive, originating from the remote computing device, a set of restrictions associated with the dataset identifier;

retrieve, from the repository, dataset permissions of use information associated with the dataset identifier;

determine, by comparing the set of restrictions with the dataset permissions of use information, that the set of restrictions does not conflict with the dataset permissions of use information; and generate and store, in the repository, an indication that the set of restrictions is validated.

10. The apparatus of claim 9, wherein the set of restrictions comprises one or more of a set of contractual restrictions, a set of customer committed restrictions and a set of legal restrictions.

11. The apparatus of claim 9, wherein to organize the dataset into the one or more volumes, the apparatus is configured to:

receive a volume identifier data structure associated with one or more volumes;

generate volume metadata comprising one or more dataset identifiers, indicating that datasets associated with the one or more dataset identifiers belong to the one or more volumes; and store, in the repository, the volume metadata.

12. The apparatus of claim 9, wherein to attach the one or more assets to the one or more volumes, the apparatus is configured to:

receive an asset registration data structure associated with one or more assets;

store, in the repository, one or more datasets associated with each of the one or more volumes in the one or more assets based on the asset registration data structure;

generate, asset metadata indicating that the one or more datasets of each of the one or more volumes is stored in the one or more assets; and store, in the repository, the asset metadata.

13. The apparatus of claim 9, wherein to register the dataset permissions of use information regarding the dataset, the apparatus is configured to:

receive dataset permissions of use information originating from the data steward device;

generate dataset permissions of use metadata based on the dataset permissions of use information; and store, in the repository, the dataset permissions of use metadata.

14. The apparatus of claim 9, wherein the volume permissions of use information comprises one or more of: allowed account types, allowed environments, allowed use, allowed use justifications, indication of offshore allowed, or protection consumption profile.

15. The apparatus of claim 9, wherein the dataset permissions of use information defines one or more conditions under which one or more users are granted access to the dataset.

16. The apparatus of claim 9, further configured to:

receive one or more data attributes associated with the dataset from a metadata repository;

receive one or more data attribute protection policies associated with the one or more data attributes; and enforce the one or more data attribute protection policies associated with the one or more data attributes by transmitting the one or more data attribute protection policies to a data protection system, wherein the data protection system is configured to enforce the one or more data attribute protection policies on the one or more assets.

17. A computer program product comprising at least one non-transitory computer-readable storage medium having computer program instructions thereon, the computer program instructions, in execution with at least one processor, configured to:

receive, originating from a remote computing device, a dataset identifier;

organize a dataset represented by the dataset identifier into one or more volumes, each of the one or more volumes associated with a unique volume identifier;

attach one or more assets to the one or more volumes by associating one or more asset identifiers with the one or more volume identifiers, wherein each asset is configured to store at least one of the one or more volumes;

receive, originating from a data steward device, dataset permissions of use information associated with the dataset identifier, wherein the dataset permissions of use information comprises one or more of allowed use, allowed use justifications, indication of offshore allowed, or protection consumption profile;

register, in a repository, the dataset permissions of use information with the dataset by associating a dataset permissions of use information identifier associated with the dataset permissions of use information with the dataset identifier;

register, in the repository, volume permissions of use information with the one or more volumes by associating a volume permissions of use information identifier associated with the volume permissions of use information with the one or more volume identifiers, wherein to register the volume permissions of use information regarding the one or more volumes to the one or more volumes, the computer program product is configured to:

receive volume permissions of use information originating from the data steward device, wherein a data steward associated with the data steward device is designated by an owner of the dataset;

generate volume permissions of use metadata based on the volume permissions of use information; and store, in the repository, the volume permissions of use metadata;

receive, originating from the remote computing device, a set of restrictions associated with the dataset identifier;

retrieve, from the repository, dataset permissions of use information associated with the dataset identifier;

determine, by comparing the set of restrictions with the dataset permissions of use information, that the set of restrictions does not conflict with the dataset permissions of use information; and generate and store, in the repository, an indication that the set of restrictions is validated.

18. The computer program product of claim 17, wherein the set of restrictions comprises one or more of a set of contractual restrictions, a set of customer committed restrictions and a set of legal restrictions.

19. The computer program product of claim 17, wherein to organize the dataset into the one or more volumes, the computer program product is configured to:
- receive a volume identifier data structure associated with one or more volumes;
- generate volume metadata comprising one or more dataset identifiers, indicating that datasets associated with the one or more dataset identifiers belong to the one or more volumes; and
- store, in the repository, the volume metadata.

20. The computer program product of claim 17, wherein to attach the one or more assets to the one or more volumes, the computer program product is configured to:
- receive an asset registration data structure associated with one or more assets;
- store, in the repository, one or more datasets associated with each of the one or more volumes in the one or more assets based on the asset registration data structure;
- generate asset metadata indicating that the one or more datasets of each of the one or more volumes is stored in the one or more assets; and
- store, in the repository, the asset metadata.

21. The computer program product of claim 17, wherein to register the dataset permissions of use information regarding the dataset, the computer program product is configured to:
- receive dataset permissions of use information originating from the data steward device;
- generate dataset permissions of use metadata based on the dataset permissions of use information; and
- store, in the repository, the dataset permissions of use metadata.

22. The computer program product of claim 17, wherein the volume permissions of use information comprises one or more of: allowed account types, allowed environments, allowed use, allowed use justifications, indication of off-shore allowed, or protection consumption profile.

23. The computer program product of claim 17, wherein the dataset permissions of use information defines one or more conditions under which one or more users are granted access to the dataset.

24. The computer program product of claim 17, further configured to:
- receive one or more data attributes associated with the dataset from a metadata repository;
- receive one or more data attribute protection policies associated with the one or more data attributes; and
- enforce the one or more data attribute protection policies associated with the one or more data attributes by transmitting the one or more data attribute protection policies to a data protection system, wherein the data protection system is configured to enforce the one or more data attribute protection policies on the one or more assets.

* * * * *